(12) United States Patent
Moriya et al.

(10) Patent No.: US 7,982,744 B2
(45) Date of Patent: Jul. 19, 2011

(54) IMAGE PROCESSING DEVICE, IMAGE PROCESSING METHOD, IMAGE PROCESSING PROGRAM, RECORDING MEDIUM STORING IMAGE PROCESSING PROGRAM, AND IMAGE DISPLAY DEVICE

(75) Inventors: Hidekuni Moriya, Suwa (JP); Takumi Aragaki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 841 days.

(21) Appl. No.: 11/968,961

(22) Filed: Jan. 3, 2008

(65) Prior Publication Data
US 2008/0186314 A1 Aug. 7, 2008

(30) Foreign Application Priority Data

Feb. 2, 2007 (JP) .................................. 2007-024200
Nov. 5, 2007 (JP) .................................. 2007-287503

(51) Int. Cl.
*G09G 3/20* (2006.01)
*G09G 5/02* (2006.01)
*G09G 3/36* (2006.01)
*G06T 3/40* (2006.01)
*H04N 1/46* (2006.01)
*H04N 1/60* (2006.01)
*H04N 9/12* (2006.01)
*G06T 1/00* (2006.01)
*G09G 5/00* (2006.01)
*G11B 15/00* (2006.01)

(52) U.S. Cl. ........ 345/581; 345/590; 345/606; 345/690; 345/549; 348/254; 348/279; 348/557; 348/671; 358/518; 358/523; 358/525; 382/162; 382/167; 382/254; 382/300

(58) Field of Classification Search .......... 345/427–428, 345/581, 589–592, 597, 600, 601, 604, 606, 345/610, 613, 618, 549, 560, 204, 690; 348/253–254, 271, 277, 279, 496, 519, 557, 348/577, 671; 358/518–519, 523, 525
See application file for complete search history.

(56) References Cited

U.S. PATENT DOCUMENTS

| | | | | |
|---|---|---|---|---|
| 5,300,944 | A * | 4/1994 | Shapiro et al. ................... | 345/88 |
| 6,486,859 | B1 * | 11/2002 | Croll et al. ...................... | 345/72 |
| 2007/0257944 | A1 * | 11/2007 | Miller et al. ................... | 345/694 |
| 2009/0174638 | A1 * | 7/2009 | Brown Elliott et al. ........ | 345/88 |

FOREIGN PATENT DOCUMENTS

| JP | 2002-040980 | 2/2002 |
|---|---|---|
| JP | 2003-295812 | 10/2003 |

\* cited by examiner

*Primary Examiner* — Wesner Sajous
(74) *Attorney, Agent, or Firm* — Oliff & Berridge, PLC

(57) ABSTRACT

An image processing device outputs four-color image data to a display section, the display section performing display using display pixels each composed of four sub-pixels, and having an arrangement of the display pixels in which a pixel arrangement in an even line of a scan lines and a pixel arrangement in an odd line of the scan lines are shifted a half pitch of the display pixels from each other, and the image processing device includes a color conversion section which obtains three-color image data and converts the three-color image data into first four-color image data while maintaining the number of display pixels in the three-color image data, a conversion section which generates second four-color image data by performing an interpolation process on the first four-color image data based on a relationship between a position of a sub-pixel in the first four-color image data and a position of a sub-pixel in the display section, and an output section which outputs the second four-color image data to the display section.

15 Claims, 23 Drawing Sheets

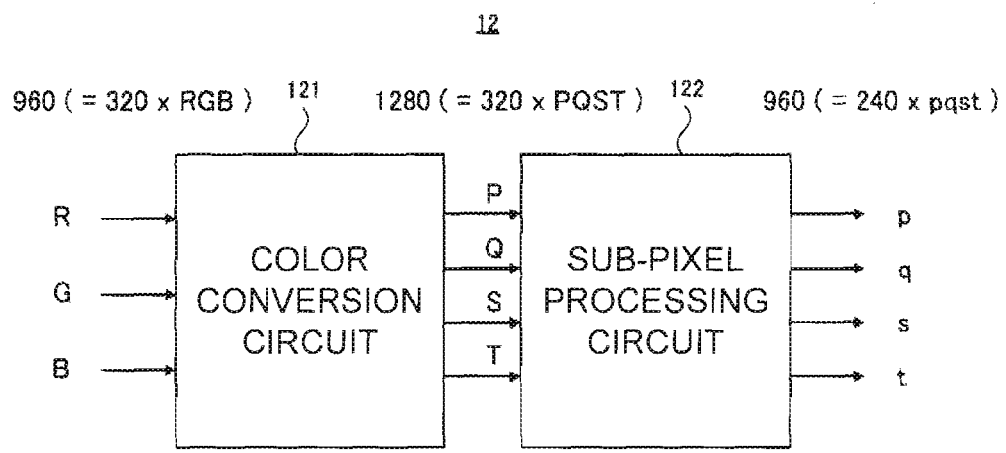
FIG. 8
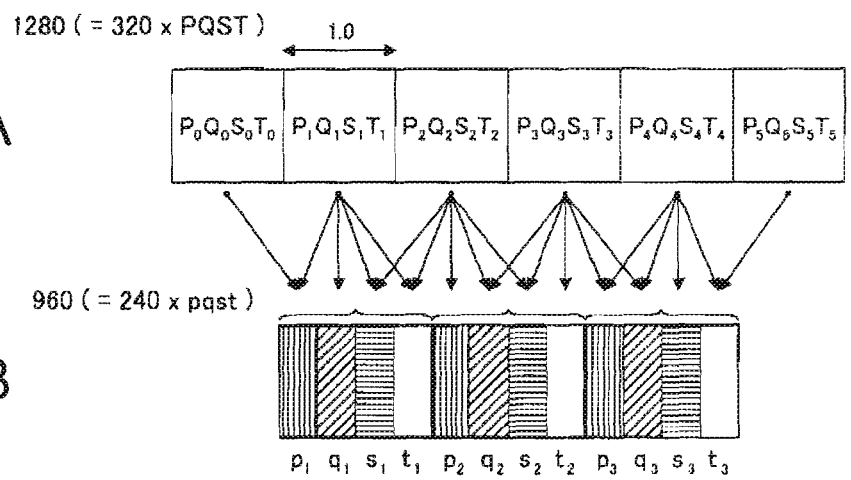
FIG. 9A
FIG. 9B

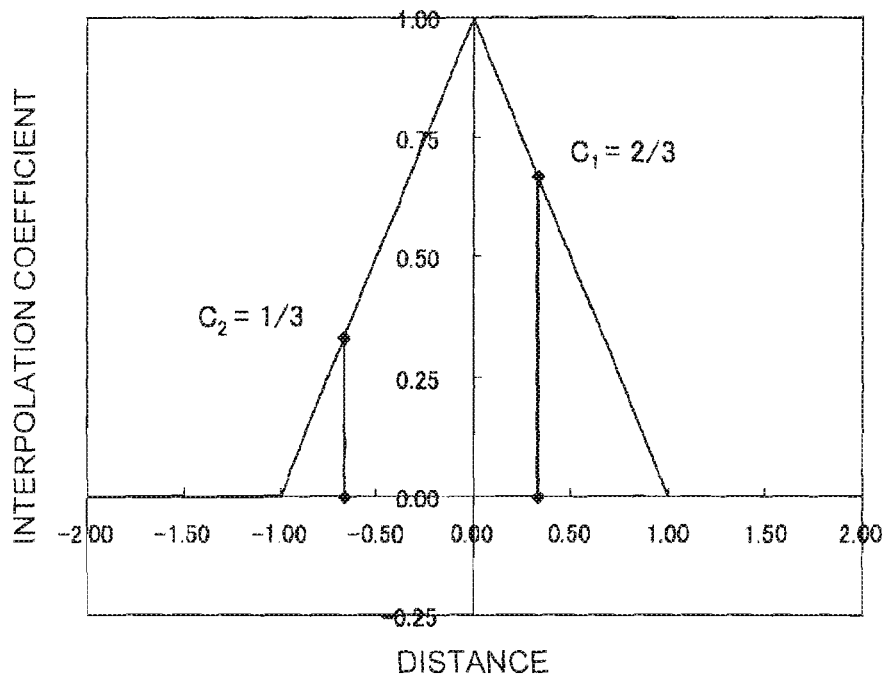
FIG.10
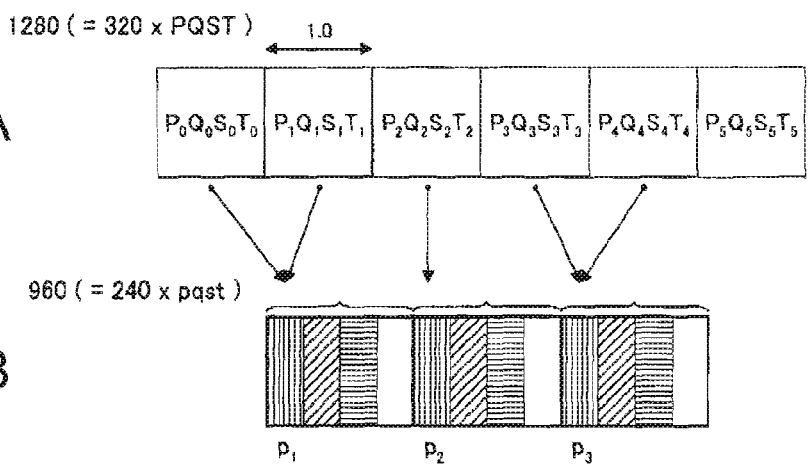
FIG.11A
FIG.11B
FIG.11C

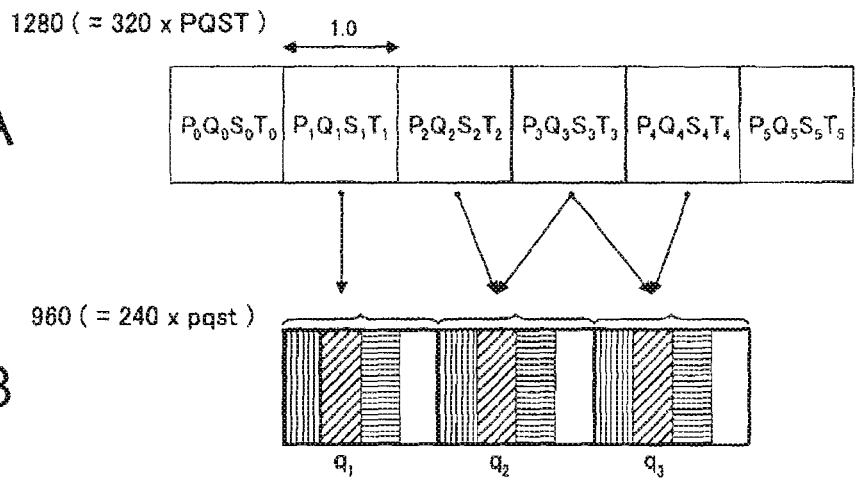
FIG.12A
FIG.12B
FIG.12C $\begin{cases} q_1 = Q_1 \\ q_2 = C_1 Q_2 + C_2 Q_3 \\ q_3 = C_2 Q_3 + C_1 Q_4 \end{cases}$
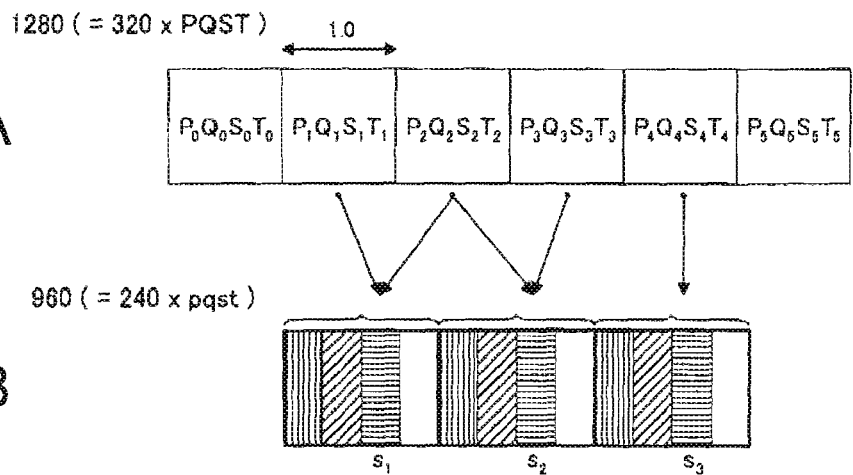
FIG.13A
FIG.13B
FIG.13C $\begin{cases} s_1 = C_1 S_1 + C_2 S_2 \\ s_2 = C_2 S_2 + C_1 S_3 \\ s_3 = S_4 \end{cases}$

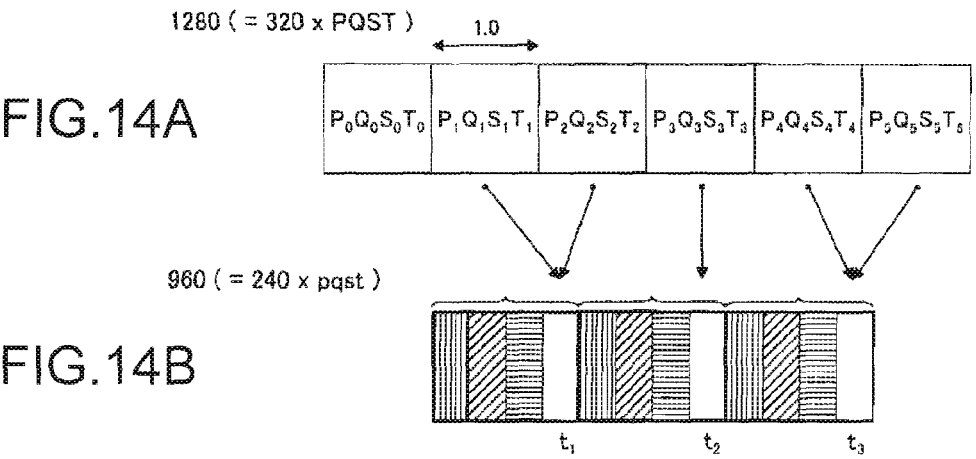
FIG. 14A
FIG. 14B
FIG. 14C $\begin{cases} t_1 = C_2T_1 + C_1T_2 \\ t_2 = T_3 \\ t_3 = C_1T_4 + C_2T_5 \end{cases}$
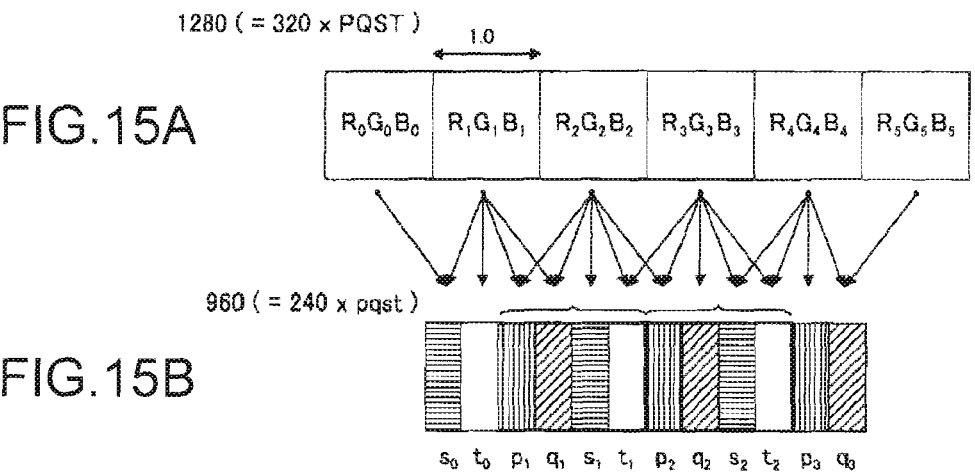
FIG. 15A
FIG. 15B
FIG. 15C $\begin{cases} s_0 = C_2S_0 + C_1S_1 \\ s_1 = S_2 \\ s_2 = C_1S_3 + C_2S_4 \end{cases}$ $\begin{cases} t_0 = T_1 \\ t_1 = C_1T_2 + C_2T_3 \\ t_2 = C_2T_3 + C_1T_4 \end{cases}$ $\begin{cases} p_1 = C_1P_1 + C_2P_2 \\ p_2 = C_2P_2 + C_1P_3 \\ p_3 = P_4 \end{cases}$ $\begin{cases} q_1 = C_2Q_1 + C_1Q_2 \\ q_2 = Q_3 \\ q_3 = C_1Q_4 + C_2Q_5 \end{cases}$

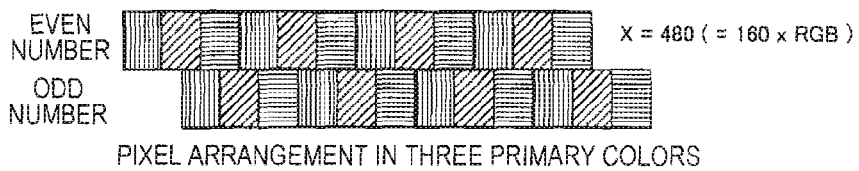
FIG.16A PIXEL ARRANGEMENT IN THREE PRIMARY COLORS
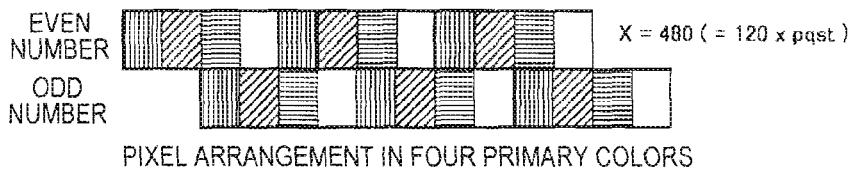
FIG.16B PIXEL ARRANGEMENT IN FOUR PRIMARY COLORS
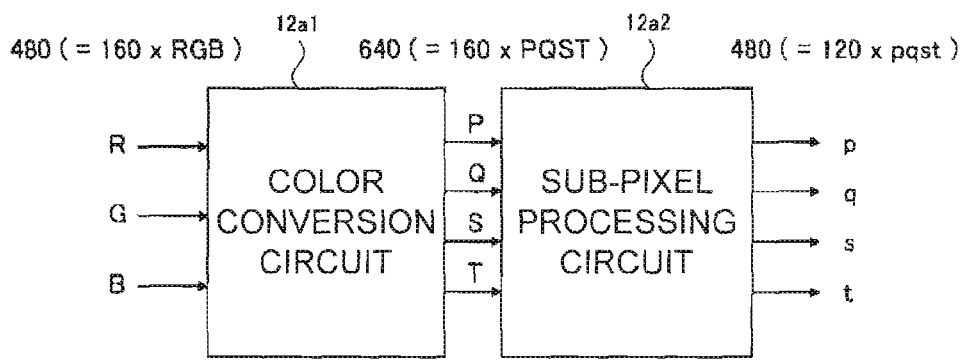
FIG.17
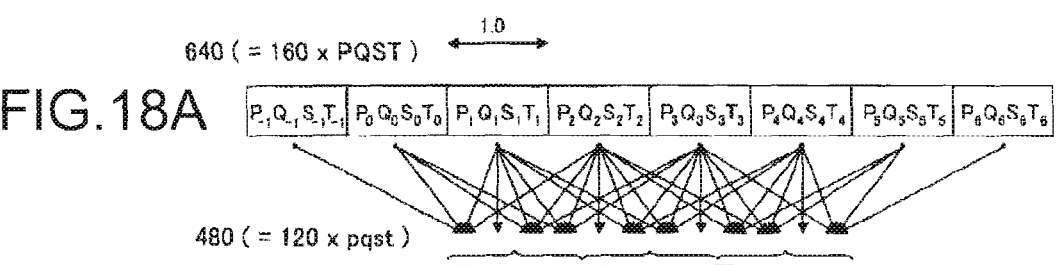
FIG.18A
FIG.18B

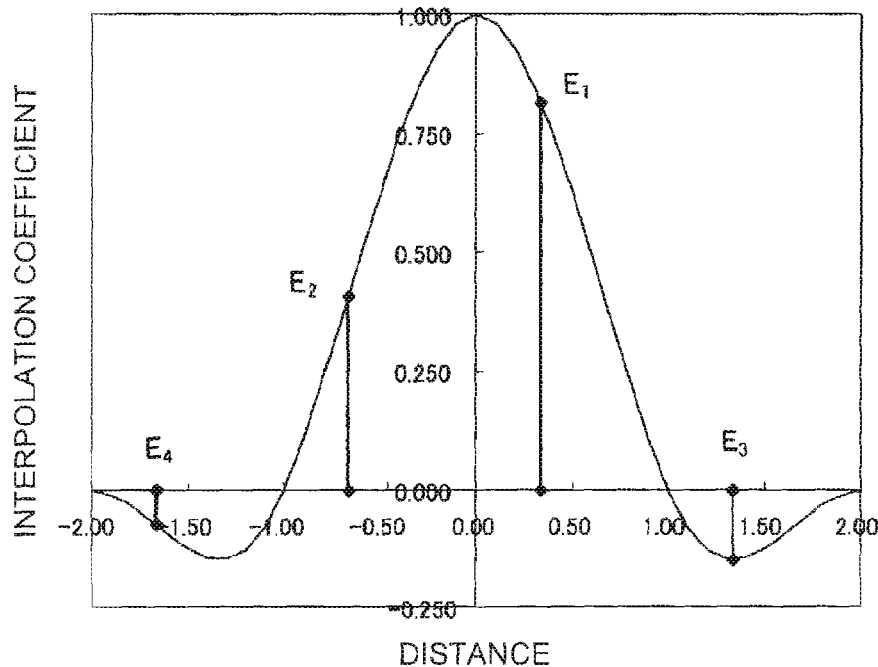
FIG.19
FIG.20A
FIG.20B
FIG.20C
$$\begin{cases} p_1 = E_4 P_{-1} + E_2 P_0 + E_1 P_1 + E_3 P_2 \\ p_2 = P_2 \\ p_3 = E_3 P_2 + E_1 P_3 + E_2 P_4 + E_4 P_5 \end{cases}$$

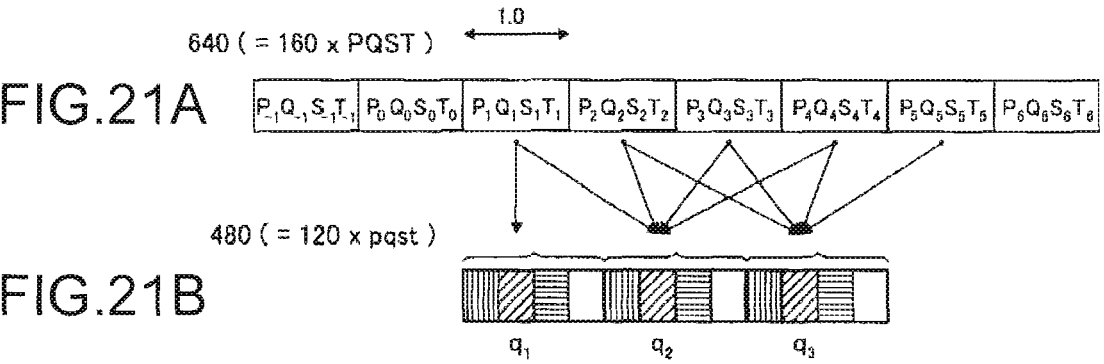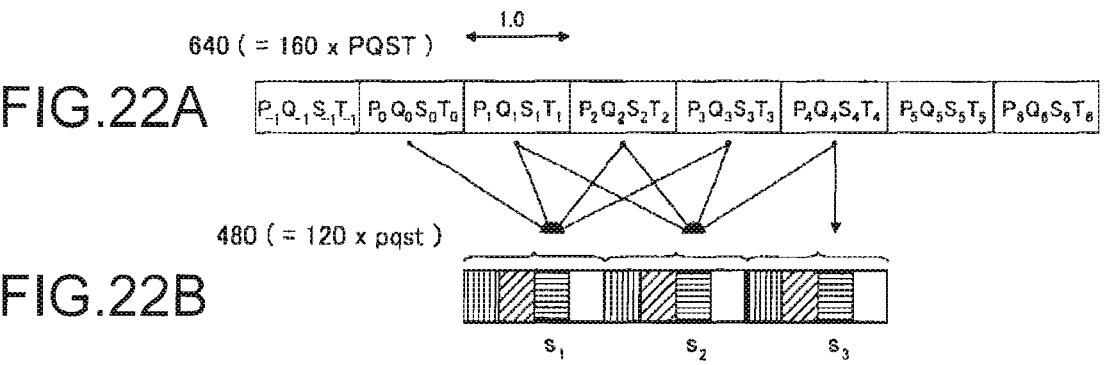

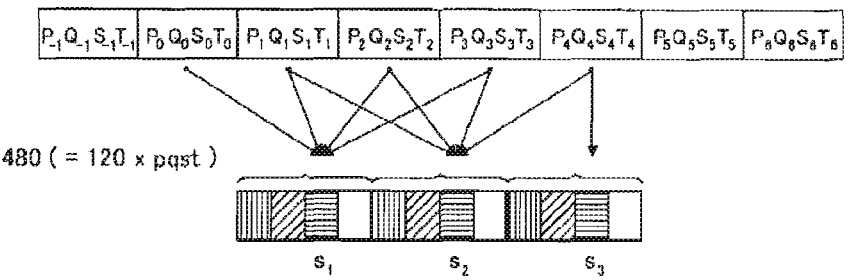
FIG.23A
FIG.23B
FIG.23C
$$s_1 = E_3S_0 + E_1S_1 + E_2S_2 + E_4S_3$$
$$s_2 = E_4S_1 + E_2S_2 + E_1S_3 + E_3S_4$$
$$s_3 = S_4$$
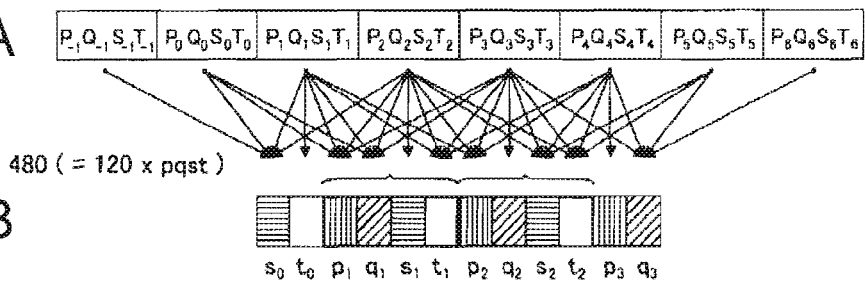
FIG.24A
FIG.24B
FIG.24C
$$s_0 = E_4S_{-1} + E_2S_0 + E_1S_1 + E_3S_2$$
$$s_1 = S_2$$
$$s_2 = E_3S_2 + E_1S_3 + E_2S_4 + E_4S_5$$
$$t_0 = T_1$$
$$t_1 = E_3T_1 + E_1T_2 + E_2T_3 + E_4T_4$$
$$t_2 = E_4T_2 + E_2T_3 + E_1T_4 + E_3T_5$$
$$p_1 = E_3P_0 + E_1P_1 + E_2P_2 + E_4P_3$$
$$p_2 = E_4P_1 + E_2P_2 + E_1P_3 + E_3P_4$$
$$p_3 = P_4$$
$$q_1 = E_4Q_0 + E_2Q_1 + E_1Q_2 + E_3Q_3$$
$$q_2 = Q_3$$
$$q_3 = E_3Q_3 + E_1Q_4 + E_2Q_5 + E_4Q_6$$

PIXEL ARRANGEMENT IN THREE PRIMARY COLORS

PIXEL ARRANGEMENT IN FOUR PRIMARY COLORS

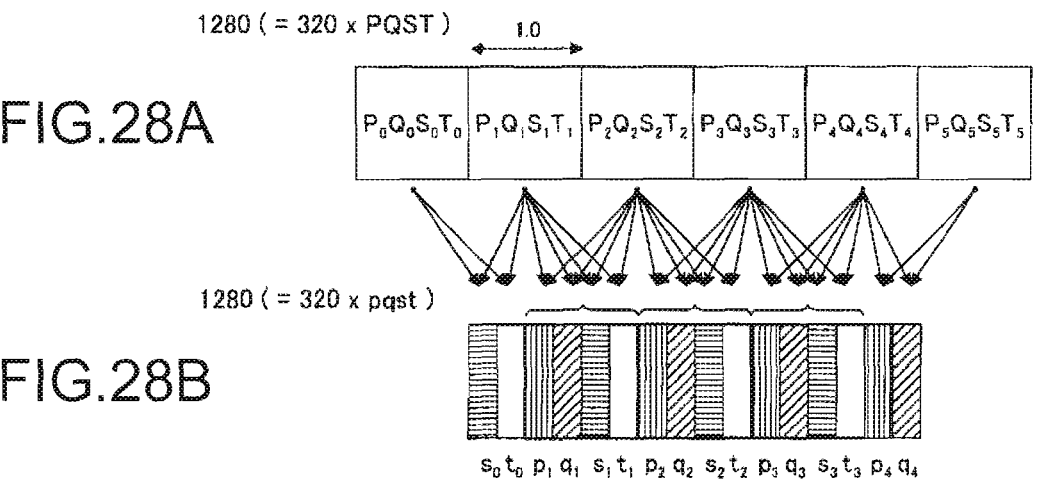
FIG.28A
FIG.28B
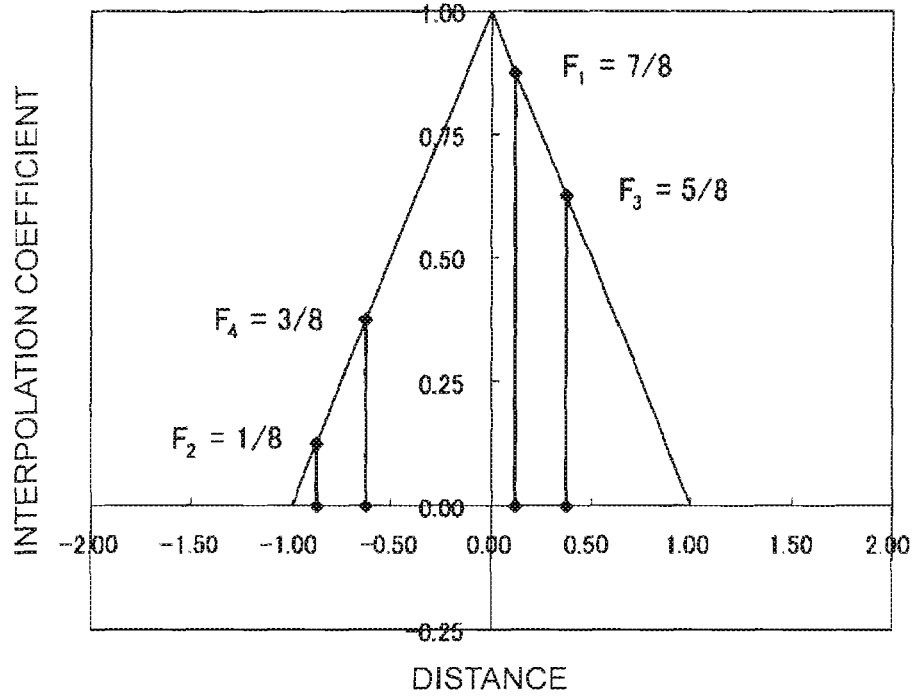
FIG.29

FIG.30A
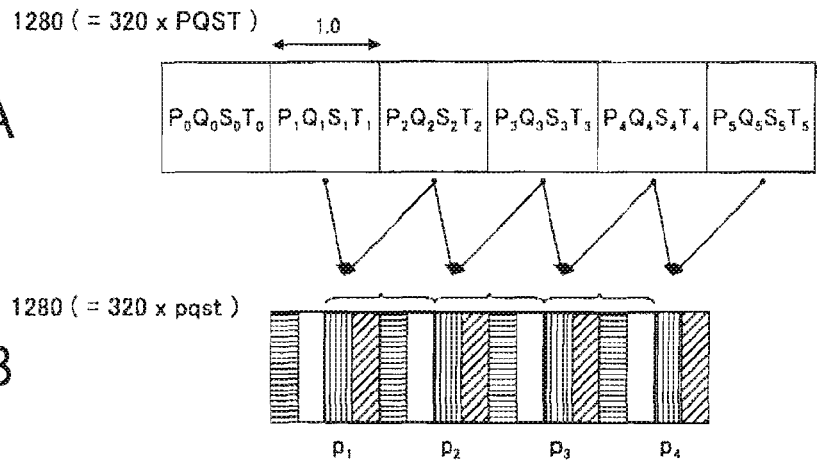
FIG.30B
FIG.30C
$$\begin{cases} p_1 = F_1P_1 + F_2P_2 \\ p_2 = F_1P_2 + F_2P_3 \\ p_3 = F_1P_3 + F_2P_4 \\ p_4 = F_1P_4 + F_2P_5 \end{cases}$$
FIG.31A
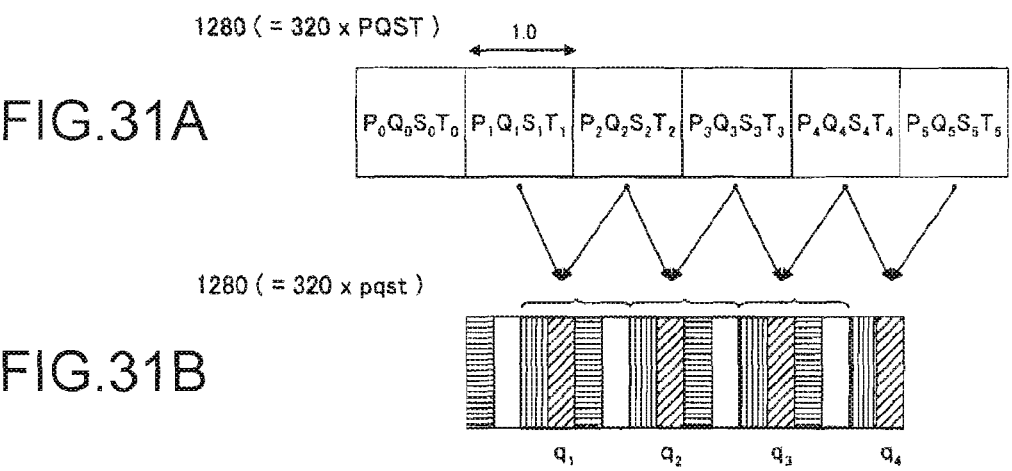
FIG.31B
FIG.31C
$$\begin{cases} q_1 = F_3Q_1 + F_4Q_2 \\ q_2 = F_3Q_2 + F_4Q_3 \\ q_3 = F_3Q_3 + F_4Q_4 \\ q_4 = F_3Q_4 + F_4Q_5 \end{cases}$$

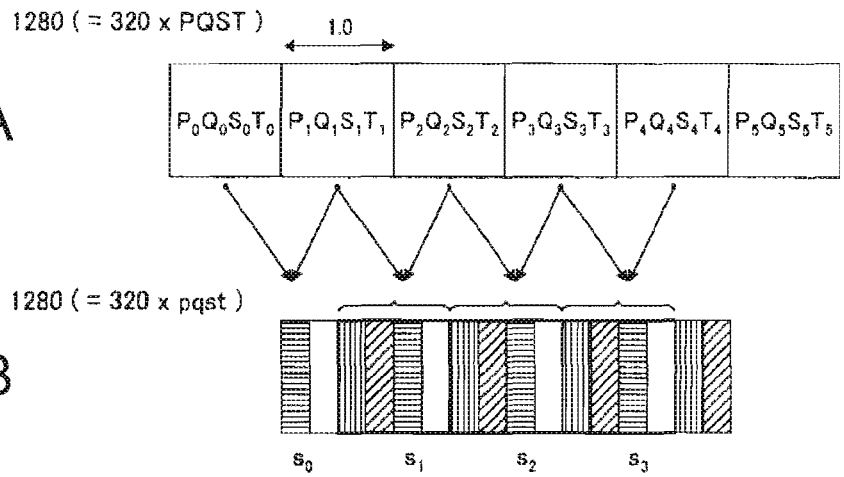
FIG.32A
FIG.32B
FIG.32C $\begin{cases} s_0 = F_4 S_0 + F_3 S_1 \\ s_1 = F_4 S_1 + F_3 S_2 \\ s_2 = F_4 S_2 + F_3 S_3 \\ s_3 = F_4 S_3 + F_3 S_4 \end{cases}$
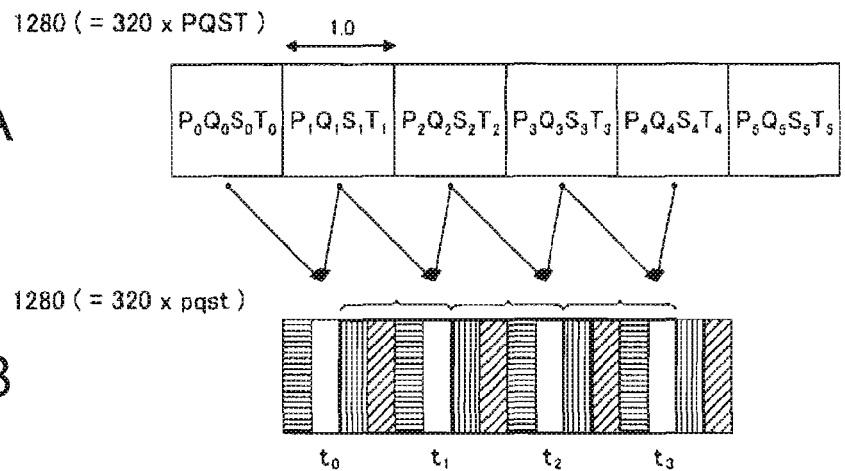
FIG.33A
FIG.33B
FIG.33C $\begin{cases} t_0 = F_2 T_0 + F_1 T_1 \\ t_1 = F_2 T_1 + F_1 T_2 \\ t_2 = F_2 T_2 + F_1 T_3 \\ t_3 = F_2 T_3 + F_1 T_4 \end{cases}$

PIXEL ARRANGEMENT IN THREE PRIMARY COLORS

PIXEL ARRANGEMENT IN FOUR PRIMARY COLORS

FIG.38C $\begin{cases} p_1 = H_2P_0 + H_1P_1 \\ p_2 = H_2P_2 + H_1P_3 \end{cases}$ FIG.39C $\begin{cases} q_1 = H_1 Q_1 + H_2 Q_2 \\ q_2 = H_1 Q_3 + H_2 Q_4 \end{cases}$ FIG.40C $\begin{cases} s_1 = H_2 S_1 + H_1 S_2 \\ s_2 = H_2 S_3 + H_1 S_4 \end{cases}$

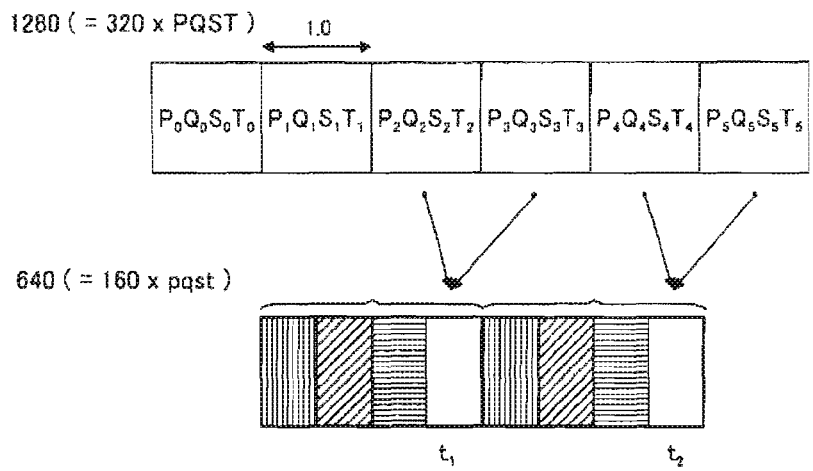
FIG.41A
FIG.41B
FIG.41C $\begin{cases} t_1 = H_1T_2 + H_2T_3 \\ t_2 = H_1T_4 + H_2T_5 \end{cases}$
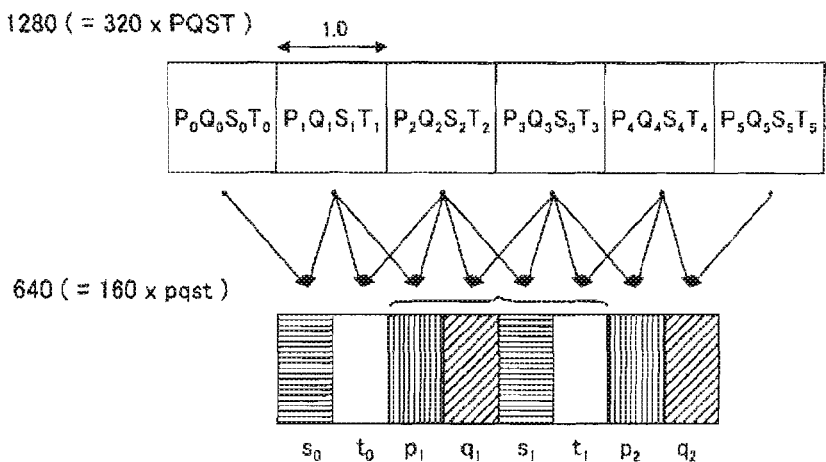
FIG.42A
FIG.42B
FIG.42C $\begin{cases} s_0 = H_2S_0 + H_1S_1 \\ s_1 = H_2S_2 + H_1S_3 \end{cases}$ $\begin{cases} t_0 = H_1T_1 + H_2T_2 \\ t_1 = H_1T_3 + H_2T_4 \end{cases}$ $\begin{cases} p_1 = H_2P_1 + H_1P_2 \\ p_2 = H_2P_3 + H_1P_4 \end{cases}$ $\begin{cases} q_1 = H_1Q_2 + H_2Q_3 \\ q_2 = H_1Q_4 + H_2Q_5 \end{cases}$

IMAGE PROCESSING DEVICE, IMAGE PROCESSING METHOD, IMAGE PROCESSING PROGRAM, RECORDING MEDIUM STORING IMAGE PROCESSING PROGRAM, AND IMAGE DISPLAY DEVICE

BACKGROUND

1. Technical Field

The present invention relates to a technical field of an image processing device, an image processing method, an image processing program, a recording medium storing an image processing program, and an image display device each for executing processing on image data.

2. Related Art

In the past, in order for improving display performance of a display device for displaying an image, various technologies have been proposed. For example, in JP-A-2002-40980 (Document 1), there is described a technology for reproducing an outline of an image using sub-pixels of R, G, and B with a goal of reducing jaggies in the outline of the image. In JP-A-2003-295812 (Document 2), there is described a color reproducing method for four primary color display device in which W (white) is added to normal R, G, and B.

However, in the technologies described in the Documents 1 and 2, it has been difficult to appropriately reduce jaggies in the outline of the image in, for example, the display device performing display using four colors. In particular, it has been difficult to appropriately reduce jaggies with the display device for performing display using four colors and having display pixels arranged so that the even lines and the odd lines are shifted a half pitch of the display pixels from each other.

SUMMARY

An advantage of some aspects of the invention is to provide an image processing device, an image processing method, an image processing program, a recording medium storing an image processing program, and an image display device capable of appropriately reducing jaggies in an image contour while performing color reproduction in four color display with the display section having even lines and odd lines shifted a half pitch of the display pixels from each other.

According to an aspect of the invention, there is provided an image processing device for outputting four-color image data to a display section, the display section performing display using display pixels each composed of four sub-pixels, and having an arrangement of the display pixels in which a pixel arrangement in an even line of a scan lines and a pixel arrangement in an odd line of the scan lines are shifted a half pitch of the display pixels from each other, the image processing device including a color conversion section which obtains the three-color image data and converts the three-color image data into a first four-color image data while maintaining the number of display pixels in the three-color image data, a conversion section which generates second four-color image data by performing an interpolation process on the first four-color image data based on a relationship between a position of a sub-pixel in the first four-color image data and a position of a sub-pixel in the display section, and an output section which outputs the second four-color image data to the display section.

The image processing device described above can preferably be used for outputting the four-color image data as the display data to the display section using display pixels each composed of four sub-pixels, and having an arrangement (i.e., the display pixels are in a delta arrangement) of the display pixels in which a pixel arrangement in an even line of a scan lines and a pixel arrangement in an odd line of the scan lines are shifted a half pitch of the display pixels from each other. Specifically, the color conversion section performs the color conversion of the three-color image data into a first four-color image data while maintaining the number of display pixels in the obtained three-color image data. Then the conversion section generates second four-color image data by performing an interpolation process on the first four-color image data based on a relationship between a position of a sub-pixel in the first four-color image data and a position of a sub-pixel in the display section. Thus, the detailed positional information as the second four-color image data can be reflected to the data to be generated for both the even line and the odd line. Therefore, according to the image processing device described above, in the case in which the display section is composed to have the even line and the odd line shifted a half pitch of the display pixels from each other, the detailed positional information of the second for-color image data can be reflected, thus the jaggies in the image contour can appropriately be reduced. Further, when the second four-color image data thus generated is displayed on the display section composed of the display pixels arranged to have the delta arrangement, the resolution in the scan line direction can artificially be improved.

In the aspect of the image processing apparatus described above, the conversion section generates the second four-color image data having the even line and the odd line shifted a half pitch of the display pixels from each other by performing the interpolation process on the first four-color image data. Thus, the appropriate image data can be output to the display section configured to have the even line and the odd line shifted a half pitch of the display pixels.

In the image processing device, is preferable that the conversion section switches operations to be performed in the interpolation process in accordance with whether the second four-color image data to be generated is positioned in the even line or in the odd line. Thus, by performing different calculations in the interpolation process, the second four-color image data having the even line and the odd line shifted a half pitch of the display pixels can appropriately be generated.

In another aspect of the image processing apparatus described above, the conversion section performs the interpolation process in accordance with whether or not the first four-color image data is data with the even line and the odd line shifted a half pitch of the display pixels. In this aspect, the conversion section performs the interpolation process in accordance with the condition of the input data. Specifically, in accordance with whether or not the input data is a data already shifted a half pitch, the conversion section can switch between performing different operations in the interpolation processes respectively for the even lines and the odd lines and performing the same operation in the interpolation processes for both the even lines and the odd lines.

In another aspect of the image processing apparatus described above, the conversion section performs the interpolation process using a linear function defined by a distance between a position of a sub-pixel in the first four-color image data and a position of a sub-pixel in the display section. Thus, the detailed positional information as the second four-color image data can effectively be reflected to the data to be generated.

In another aspect of the image processing apparatus described above, the conversion section performs the interpolation process using a cubic function defined by a distance between a position of a sub-pixel in the first four-color image data and a position of a sub-pixel in the display section.

According to the interpolation process using the cubic function as described above, in comparison, for example, with the case of performing the interpolation process using the linear function, "blur" which can be caused in the image obtained by the interpolation process can more effectively be prevented. Therefore, the interpolation process using the cubic function can be an effective measure for effectively preventing "blur" to maintain a feeling of resolution in the case in which the interpolation process is executed on the data with small number of pixels in the scan line direction.

In another aspect of the image processing apparatus described above, the conversion section generates the second four-color image data reducing the number of the display pixels to be 0.75 times of the number of display pixels in the first four-color image data. Thus, the second four-color image data with the same total number of data as that of the three-color image data can be generated. By arranging the second four-color image data thus generated as described above, the three-color pixel layout used generally can directly be used, thus it becomes possible to improve the design efficiency.

In another aspect of the image processing apparatus described above, the conversion section generates the second four-color image data reducing the number of the display pixels to be 0.5 times of the number of display pixels in the first four-color image data. Since in the case in which the second four-color image data thus generated is arranged, the area of the sub-pixel tends to increase, the relative aperture ratio can be increased. Therefore, it becomes possible to realize a bright display section. Further, according to the image processing device described above, if the three-color image data on which no processing for reducing the number of data has been executed is input, it is possible to generate the second four-color image data with the number of display pixels reduced to be a half of the number of display pixels of the three-color image data. Therefore, an additional external circuit for converting the number of pixels, for example, can be eliminated, thus it becomes possible to adopt the configuration with lower cost as a whole.

In another aspect of the image processing apparatus described above, the conversion section generates the second four-color image data having the same number of the display pixels as the number of display pixels in the first four-color image data. According to the image processing device described above, the second four-color image data having the even line and the odd line shifted a half pitch of the display pixels and the same number of display pixels as that of the three-color image data can appropriately be generated.

It is preferable that the first and the second four-color image data are composed of red, green, blue, and white.

Further, it is preferable that the first and the second four-color image data are composed of red, yellow-green, blue, and emerald-green.

In the image processing device, it is preferable that the color conversion section performs the color conversion using at least on of a three-dimensional look-up table and a one-dimensional look-up table.

It should be noted that the image processing device described above can preferably be applied to an image display device provided at least with a display section for displaying the image data.

According to another aspect of the invention, there is provided an image processing method for outputting four-color image data to a display section, the display section performing display using display pixels each composed of four sub-pixels, and having an arrangement of the display pixels in which a pixel arrangement in an even line of a scan lines and a pixel arrangement in an odd line of the scan lines are shifted a half pitch of the display pixels from each other, the image processing method including the step of converting the three-color image data obtained previously into a first four-color image data while maintaining the number of display pixels in the three-color image data, the step of generating second four-color image data by performing an interpolation process on the first four-color image data based on a relationship between a position of a sub-pixel in the first four-color image data and a position of a sub-pixel in the display section, and the step of outputting the second four-color image data to the display section.

According to still another aspect of the invention, there is provided an image processing program for allowing a computer to output four-color image data to a display section, the display section performing display using display pixels each composed of four sub-pixels, and having an arrangement of the display pixels in which a pixel arrangement in an even line of a scan lines and a pixel arrangement in an odd-line of the scan lines are shifted a half pitch of the display pixels from each other, the image processing device program allowing the computer to function as a device including a color conversion section which obtains the three-color image data and converts the three-color image data into a first four-color image data while maintaining the number of display pixels in the three-color image data, a conversion section which generates second four-color image data by performing an interpolation process on the first four-color image data based on a relationship between a position of a sub-pixel in the first four-color image data and a position of a sub-pixel in the display section, and an output section which outputs the second four-color image data to the display section.

Also by executing the image processing method and the image processing program, in the case in which the display section is composed to have the even line and the odd line shifted a half pitch of the display pixels from each other, the detailed positional information of the second four-color image data can be reflected, thus the jaggies in the image contour can appropriately be reduced.

It should be noted that as the recording medium storing the image processing program, various computer readable medium such as a flexible disk, a CD-ROM, or an IC card can be used.

BRIEFS DESCRIPTION OF THE DRAWINGS

The invention will now be described with reference to the accompanying drawings, wherein like numbers refer to like elements.

FIG. 8 is a diagram showing change in the number of dots when executing the color conversion process and the sub-pixel process in the first embodiment.

FIGS. 9A and 9B are diagrams showing an outline of the sub-pixel process in even lines in the first embodiment.

FIG. 10 is a diagram showing an interpolation coefficient used in the first embodiment.

FIGS. 11A through 11C are diagrams showing a method of generating p pixels in an even line in the first embodiment.

FIGS. 12A through 12C are diagrams showing a method of generating q pixels in an even line in the first embodiment.

FIGS. 13A through 13C are diagrams showing a method of generating s pixels in an even line in the first embodiment.

FIGS. 14A through 14C are diagrams showing a method of generating t pixels in an even line in the first embodiment.

FIGS. 15A through 15C are diagrams showing a method of generating p, q, s, and t pixels in an odd line in the first embodiment.

FIGS. 16A and 16B are diagrams showing a pixel arrangement for explaining a sub-pixel process in a second embodiment.

FIG. 17 is a diagram showing change in the number of dots when executing the color conversion process and the sub-pixel process in the second embodiment.

FIGS. 18A and 18B are diagrams showing an outline of the sub-pixel process in even lines in the second embodiment.

FIG. 19 is a diagram showing an interpolation coefficient used in the second embodiment.

FIGS. 20A through 20C are diagrams showing a method of generating p pixels in an even line in the second embodiment.

FIGS. 21A through 21C are diagrams showing a method of generating q pixels in an even line in the second embodiment.

FIGS. 22A through 22C are diagrams showing a method of generating s pixels in an even line in the second embodiment.

FIGS. 23A through 23C are diagrams showing a method of generating t pixels in an even line in the second embodiment.

FIGS. 24A through 24C are diagrams showing a method of generating p, q, s, and t pixels in an odd line in the second embodiment.

FIGS. 28A and 28B are diagrams showing an outline of the sub-pixel process in odd lines in the third embodiment.

FIG. 29 is a diagram showing an interpolation coefficient used in the third embodiment.

FIGS. 30A through 30C are diagrams showing a method of generating p pixels in an even line in the third embodiment.

FIGS. 31A through 31C are diagrams showing a method of generating q pixels in an even line in the third embodiment.

FIGS. 32A through 32C are diagrams showing a method of generating s pixels in an even line in the third embodiment.

FIGS. 33A through 33C are diagrams showing a method of generating t pixels in an even line in the third embodiment.

FIGS. 38A through 38C are diagrams showing a method of generating p pixels in an even line in the fourth embodiment.

FIGS. 39A through 39C are diagrams showing a method of generating q pixels in an even line in the fourth embodiment.

FIGS. 40A through 40C are diagrams showing a method of generating s pixels in an even line in the fourth embodiment.

FIGS. 41A throuoh 41C are diagrams showing a method of generating t pixels in an even line in the fourth embodiment.

FIGS. 42A throuoh 42C are diagrams showing a method of generating p, q, s, and t pixels in an odd line in the fourth embodiment.

Figure 43A:
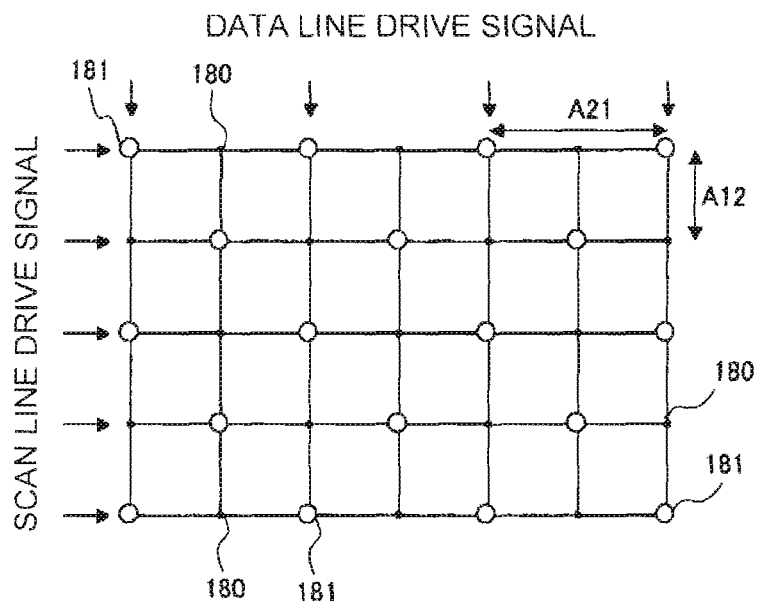
Figure 43B:
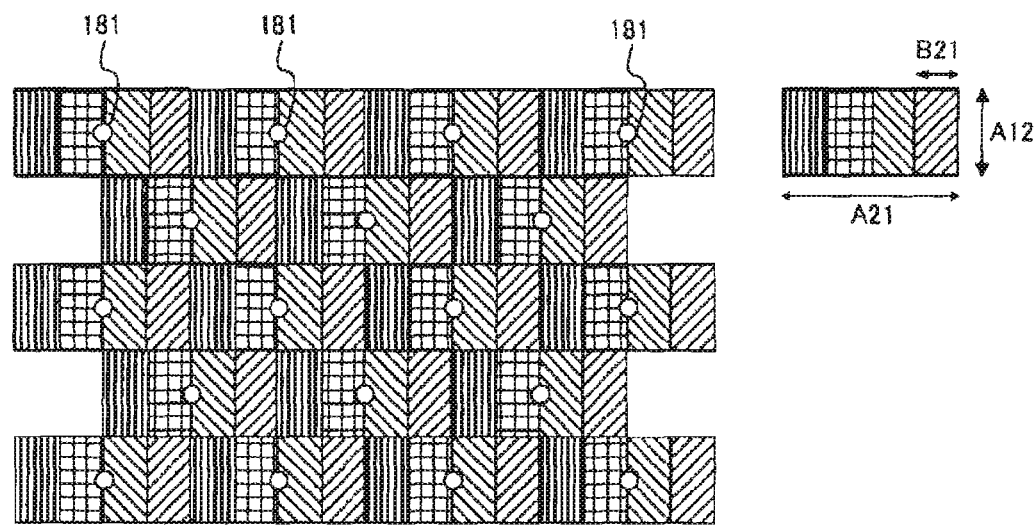

FIGS. 43A and 43B are diagrams for explaining a display pixel arrangement according to a first example.

Figure 44A:
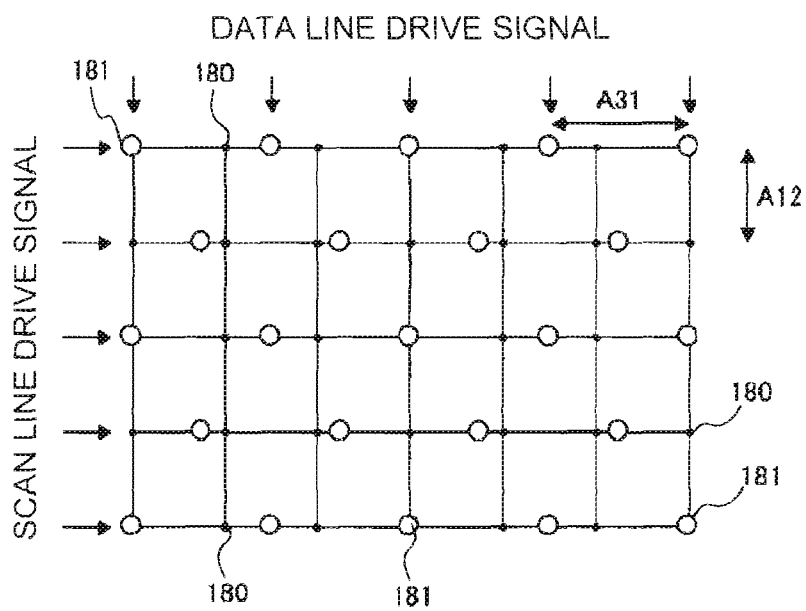
Figure 44B:
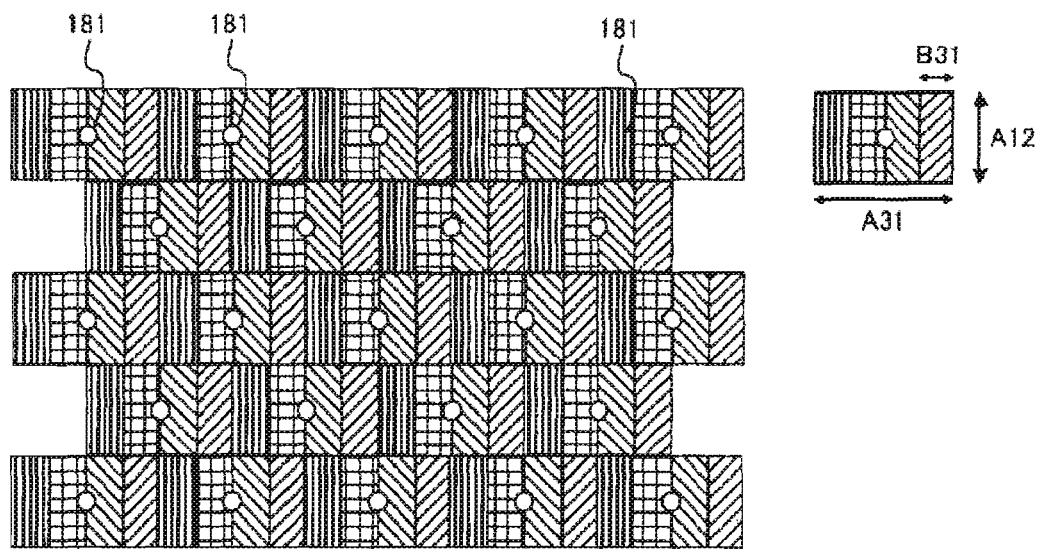

FIGS. 44A and 44B are diagrams for explaining a display pixel arrangement according to a second example.

Figure 45A:
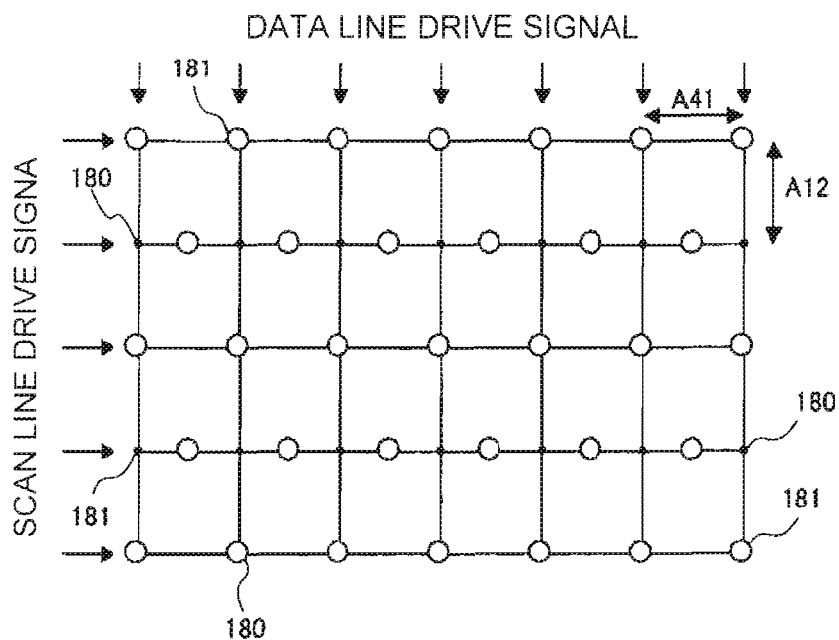
Figure 45B:
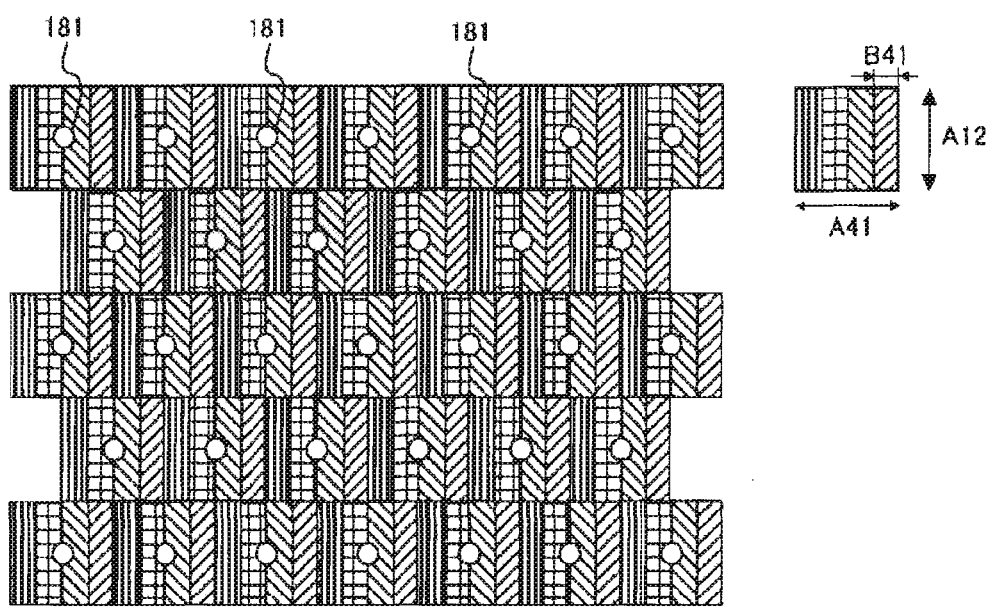

FIGS. 45A and 45B are diagrams for explaining a display pixel arrangement according to a third example.

DESCRIPTION OF EXEMPLARY EMBODIMENTS

Hereinafter, preferred embodiments of the invention will be described with reference to the accompanying drawings.

First Embodiment

Firstly, a first embodiment of the invention will be explained.

Overall Configuration

Figure 1:
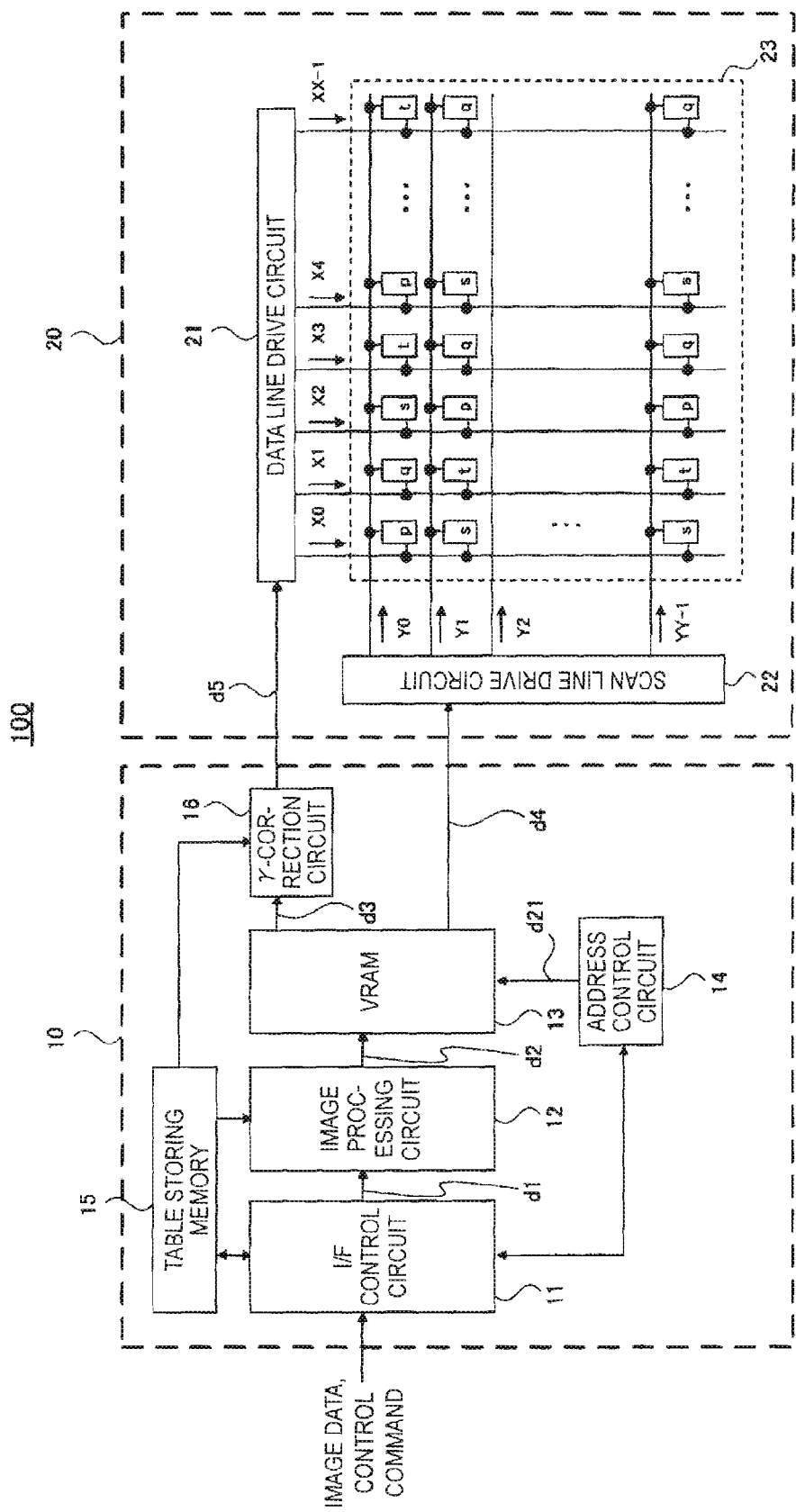
FIG. 1 is a block diagram showing a schematic configuration of an image display device according to a first embodiment of the invention.

FIG. 1 is a block diagram showing a schematic configuration of an image display device 100 according to a first embodiment of the invention. The image display device 100 is provided with an image processing section 10 for acquiring image data and control commands from the outside to execute image processing on the image data, and a display section 20 for displaying the image data on which the image processing is executed by the image processing section 10.

The image display device 100 is configured to be able to display images using four colors of p, q, s, and t (hereinafter a fundamental color used for displaying images is also referred to as "a primary color"). Specifically, the display section 20 in the image display device 100 displays an image using display pixels each composed of a set of four sub-pixels (assumed to denote pixels corresponding to primary colors) respectively corresponding to the four primary colors p, q, s, and t). As one example, red, yellow-green, blue, and emerald-green can be used as the four primary colors p, q, s, and t. In this case, a brilliant display device with an expanded color reproduction range can be realized. As another example, red, green, blue, and white can be used as the four primary colors p, q, s, and t. In this case, a bright display device with high surface luminance can be realized.

The image processing section 10 is provided with an I/F control circuit 11, an image processing circuit 12, a video RAM (VRAM) 13, an address control circuit 14, a table storing memory 15, and a γ-correction circuit 16.

The I/F control circuit 11 acquires the image data and the control commands from the outside (e.g., a camera), and supplies the image processing circuit 12 with the image data d1 after adjusting the timing of the input data. The image processing circuit 12 executes a color conversion process and a sub-pixel process described later on the image data d1 thus acquired to generate image data d2. It should be noted that the image processing circuit 12 is equivalent to the image processing device according to the embodiment of the invention.

Specifically, the image processing circuit 12 functions as a color conversion section, a conversion section, and an output section.

The image data d2 on which the image processing is executed by the image processing circuit 12 is written into the VRAM 13. The image data d2 thus written into the VRAM 13 is retrieved by the γ-correction circuit 16 as image data d3 in accordance with a control signal d21 from the address control circuit 14. Simultaneously, an address signal d4 corresponding to data not yet displayed is supplied to a scan line drive circuit 22 in the display section 20. Thus, it becomes possible that a data line drive circuit 21 and the scan line drive circuit 22 drive a display panel 23 in sync with each other. Further, the γ-correction circuit 16 executes the γ-correction on the image data d3 thus acquired based on the correction data stored in the table storing memory 15. Further, the γ-correction circuit 16 supplies the data line drive circuit 21 in the display section 20 with image data d5 on which the γ-correction has been executed.

The display section 20 is provided with the data line drive circuit 21, a scan line drive circuit 22, and the display panel 23. The data line drive circuit 21 supplies "X" data lines with data line drive signals $X_0$ through $X_{X-1}$, and the scan line drive circuit 22 supplies "Y" scan lines with scan line drive signals $Y_0$ through $Y_{Y-1}$. Specifically, the scan line drive circuit 22 selects a pixel row in the lateral direction at a constant frequency, and the data line drive circuit 21 supplies the pixel row selected by the scan line drive circuit 22 with respective drive signals. In this case, the data line drive circuit 21 and the scan line drive circuit 22 should drive the display panel 23 in sync with each other. The display panel 23 is composed of a liquid crystal device (LCD) and so on, and displays images such as characters or pictures to be displayed thereon in response to application of voltages on the scan lines and the data lines. Further, the display panel 23 is configured to be able to display the four primary colors of p, q, s, and t described above. It should be noted that in the present embodiment, the display panel 23 has the display pixels arranged so that the pixel arrangement in even lines of the scan lines and the pixel arrangement in odd lines in the scan lines are shifted a half pitch of the unit display pixel (unit color) (namely, shifted two sub-pixels) from each other. In other words, the display pixels vertically adjacent to each other in the data line direction in the display panel 23 are shifted a half pitch of the unit display pixel from each other. Hereinafter, such an arrangement of the display pixels as described above is also referred to as a delta arrangement.

It should be noted that although the VRAM 13 is an effective measure for reducing the power consumption in the case in which the same display data is repeatedly displayed, the image display device 100 can be configured without using the VRAM 13 if there is no sticking to the reduction of the power consumption. In such a case, display is performed while the address control circuit 14 and the scan line drive circuit 22 are directly connected to each other, and the scan line drive circuit 22 and the data line drive circuit 21 are in sync with each other.

Figure 2:
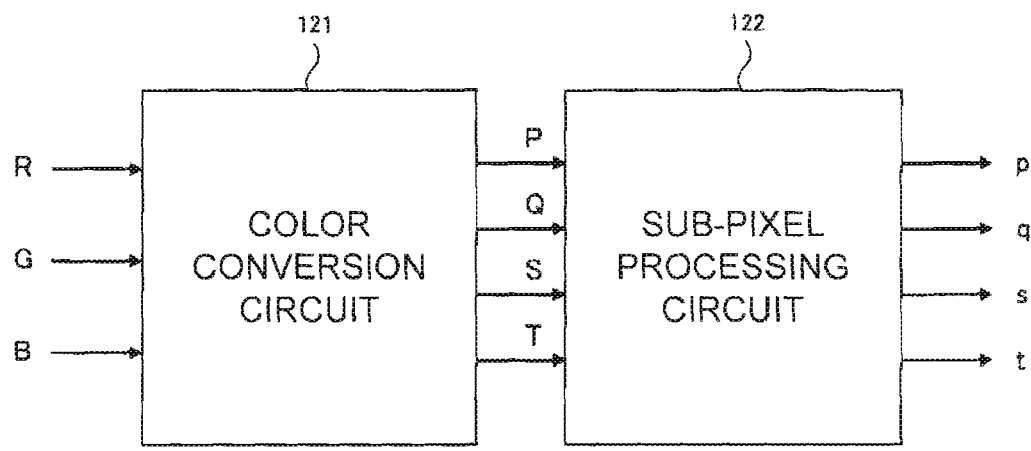
FIG. 2 is a block diagram showing a schematic configuration of an image processing circuit.

FIG. 2 is a block diagram showing a schematic configuration of the image processing circuit 12. The image processing circuit 12 is provided with a color conversion circuit 121 and a sub-pixel processing circuit 122. The color conversion circuit 121 is a circuit for performing a process (hereinafter referred to as "a color conversion process") of performing a conversion from three primary colors R, G, and B to four primary colors P, Q, S, and T while maintaining the number of pixels in the three primary colors R, G, and B. The sub-pixel processing circuit 122 is a circuit for performing a process (hereinafter referred to as "a sub-pixel process") of generating four primary colors p, q, s, and t from the four primary colors P, Q, S, and T. It should be noted that the four primary colors P, Q, S, and T is equivalent to first four-color image data, and the four primary colors p, q, s, and t is equivalent to second four-color image data.

Figure 3:
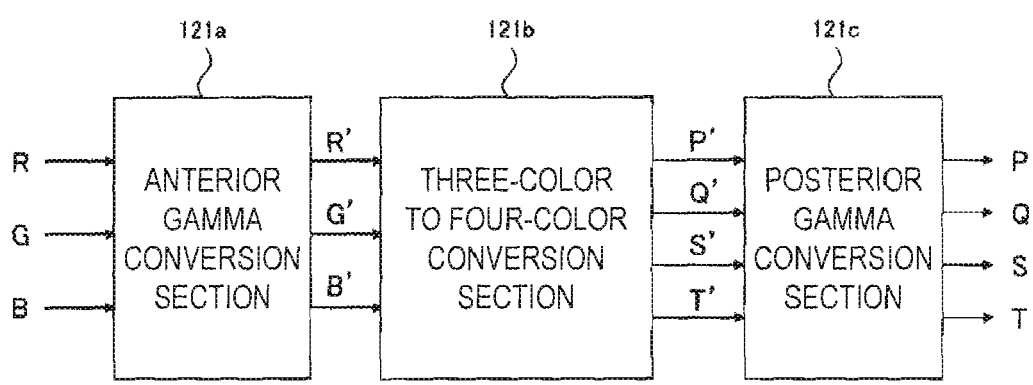
FIG. 3 is a block diagram showing a schematic configuration of a color conversion circuit.

FIG. 3 is a block diagram showing a schematic configuration of the color conversion circuit 121 described above. The color conversion circuit 121 is a circuit for performing the color conversion process from the three primary colors R, G, and B to the four primary colors P, Q, S, and T, and is provided with an anterior gamma conversion section 121a, a three-color to four-color conversion section 121b, and a posterior gamma conversion section 121c.

Figure 4:
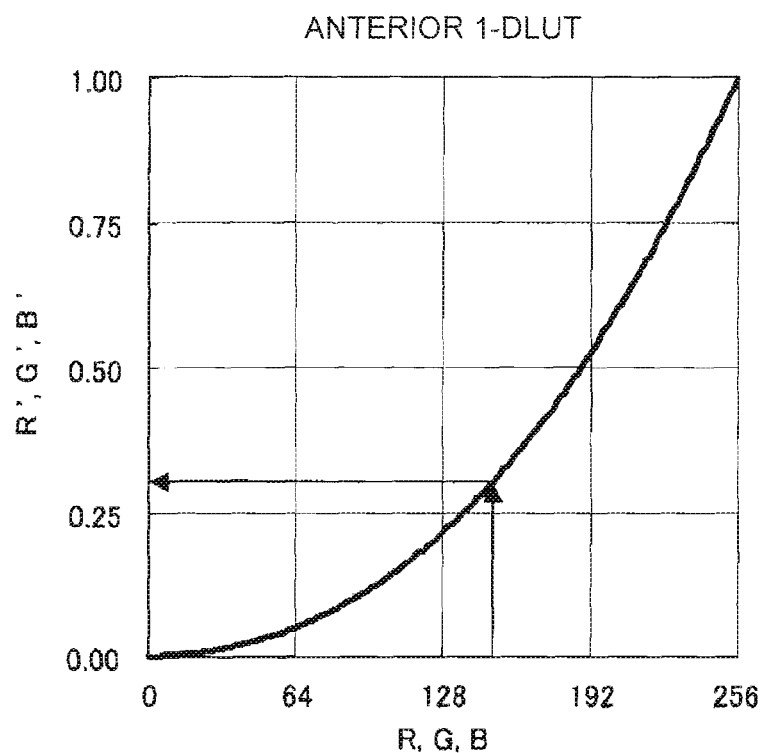
FIG. 4 is a diagram showing an example of an anterior 1-DLUT.

The anterior gamma conversion section 121a is a processing section for acquiring the three primary colors R, G, and B (corresponding to the image data d1) from the I/F control circuit 11 described above, and performing gamma conversion (hereinafter referred to as "anterior gamma conversion") on the three primary colors R, G, and B data, thereby generating three primary colors R', G', and B'. Specifically, the anterior gamma conversion section 121a performs the anterior gamma conversion using a one-dimensional look-up table (hereinafter referred to as "a 1-DLUT") for every color because the gamma conversion has already been executed on the input three primary colors R, G, and B in an input device such as a digital camera. FIG. 4 shows an example of the 1-DLUT (hereinafter referred to as "an anterior 1-DLUT"). In FIG. 4, the three primary colors R, G, and B to be input are represented on the horizontal axis, and the three primary colors R', G', and B' after the anterior gamma conversion are represented on the vertical axis. It should be noted that the anterior 1-DLUT is commonly used for every color.

Figure 5:
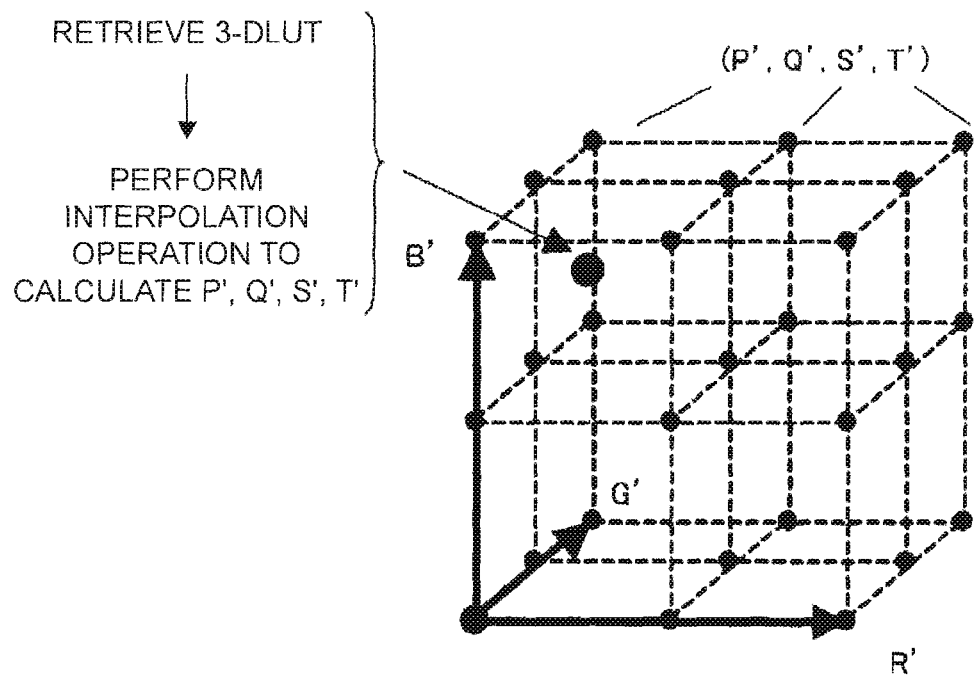
FIG. 5 is a diagram for explaining three-color to four-color conversion.

Going back to FIG. 3, the explanation will be presented. The three-color to four-color conversion section 121b is a processing section for retrieving the three primary colors R', G', and B' from the anterior gamma conversion section 121a and converting (hereinafter referred to as "a three-color to four-color conversion") the three primary colors R', G', and B' into four primary colors P', Q', S', and T'. Specifically, the three-color to four-color conversion section 121b performs the three-color to four-color conversion using a three-dimensional look-up table (hereinafter referred to as "3-DLUT"). FIG. 5 is a diagram for explaining the three-color to four-color conversion. As shown in FIG. 5, the 3-DLUT can conceptually be expressed as three-dimensional lattice data. In this case, the axes of the lattice correspond to the input, and conversion data calculated previously is stored on the lattice. Here, when calculating previously the three-color to four-color conversion data on the lattice, a least square method can be used. Specifically, in the three-color to four-color conversion, 8 sets (representing 8 apexes of the cubic shown in FIG. 5) of the three-color to four-color conversion data surrounding the input three primary colors are retrieved. Further, an interpolation operation using the 8 sets is executed in accordance with the position of the input data (expressed by the large filled circle shown in FIG. 5). It should be noted that the three-color to four-color conversion focused on the 3-DLUT can improve the color conversion accuracy or realize flexibly a desired characteristic by calculating the stored conversion values optimally in accordance with the purposes.

Figure 6:
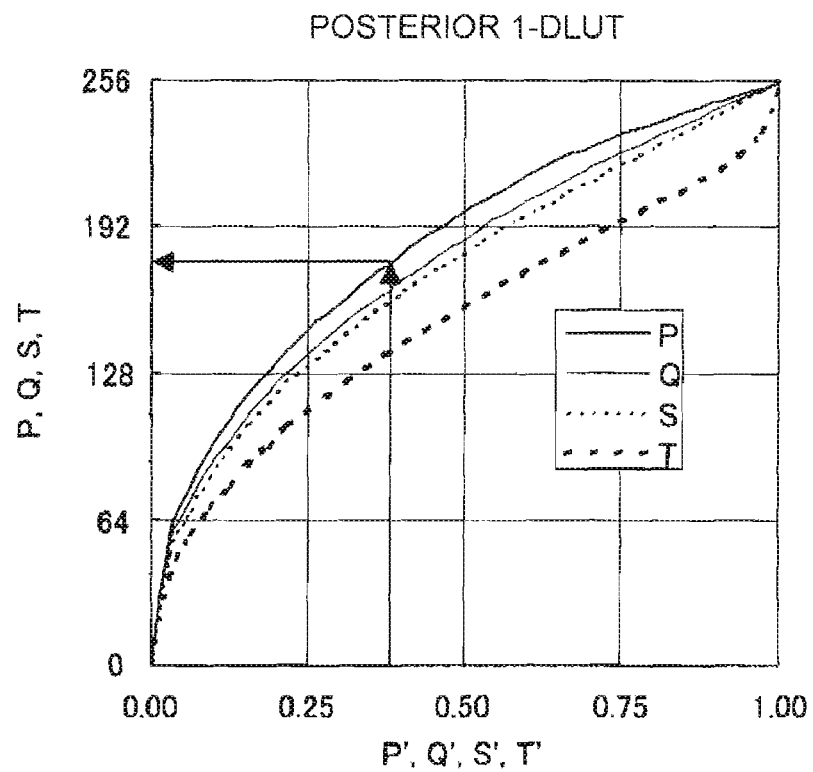
FIG. 6 is a diagram showing an example of a posterior 1-DLUT.

Going back to FIG. 3, the explanation will be presented. The posterior gamma conversion section 121c is a processing section for acquiring the four primary colors P', Q', S', and T' from the three-color to four-color conversion section 121b, and performing the gamma conversion (hereinafter referred to as "posterior gamma conversion") on the four primary colors P', Q', S', and T', thereby generating four primary colors P, Q, S, and T. The reason why the posterior namma conversion is thus executed is that the gamma setting is normally performed in the display section 20. Specifically, the posterior gamma conversion section 121c performs the posterior gamma conversion on the four primary colors P', Q', S', and T' using the 1-DLUT (hereinafter refereed to as "a posterior 1-DLUT"). FIG. 6 is a diagram showing an example of the posterior 1-DLUT. In FIG. 6, the four primary colors P', Q', S', and T' to be input are represented on the horizontal axis, and the four primary colors P, Q, S, and T after the posterior gamma conversion are represented on the vertical axis. It should be noted that the posterior 1-DLUT exists for each of the four primary colors P, Q, S, and T.

Sub-Pixel Process

Then, the sub-pixel process performed by the sub-pixel processing circuit 122 in the image processing circuit 12 will specifically be explained. In the first embodiment, the sub-pixel process is performed by the sub-pixel processing circuit 122 on the four primary colors P, Q, S, and T, on which the color conversion process has been performed by the color conversion circuit 121, basically for generating the four primary colors p, q, s, and t having the same total amount of data as in the three primary colors R, G, and B input thereto. In this case, although the number of pixels as the color units is reduced, the sub-pixel process is performed so that the decrease in the color resolution is prevented from occurring. Specifically, the sub-pixel processing circuit 122 performs the interpolation process based on the relationship between the sub-pixel positions in the four primary colors P, Q, S, and T on which the color conversion process has been performed and the sub-pixel positions (i.e., positions of the primary color in the display section 20 (the display panel 23)) in the four primary colors p, q, s, and t. In other words, by performing the interpolation process on the four primary colors P, Q, S, and T, the four primary colors p, q, s, and t are generated.

Further, the sub-pixel processing circuit 122 performs the sub-pixel process in order for generating the image data (the four primary colors p, q, s, and t) which can be displayed by the display section 20 with the display pixels having a delta arrangement. Specifically, the sub-pixel processing circuit 122 generates data, in which even lines and odd lines are shifted a half pitch of the display pixel unit from each other, as the four primary colors p, q, s, and t. Specifically, by performing the interpolation process on the four primary colors P, Q, S, and T, the four primary colors p, q, s, and t having even lines and odd lines shifted a half pitch of the display pixel unit from each other are generated. In this case, the sub-pixel processing circuit 122 performs the operation in the interpolation process in accordance with whether the data of the four primary colors p, q, s, and t to be generated is positioned in an even line or an odd line. In other words, the different operations are performed between in the case in which the data of the four primary colors p, q, s, and t is positioned in an even line and in the case in which the data thereof is positioned in an odd line. It should be noted that the sub-pixel processing circuit 122 performs the different operations in the interpolation process between the even lines and the odd lines as described above basically in the case in which the data is input, on which the process for shifting a half pitch has not been executed in a main system (e.g., CPU) side of an information device on which the image display device 100 is mounted. On the contrary, in the case in which the data on which the process for shifting a half pitch has already been executed on the main system side is input, the sub-pixel processing circuit 122 does not perform such different operations. In this case, the same operation is executed in the interpolation process for both the even lines and the odd lines. It should be noted that as a method of discriminating whether or not the process of shifting a half pitch has already been executed on the data, for example, there can be cited a method of discriminating by referring a flag provided to the top of the data and representing whether or not the data is shifted a half pitch.

Figure 7A:
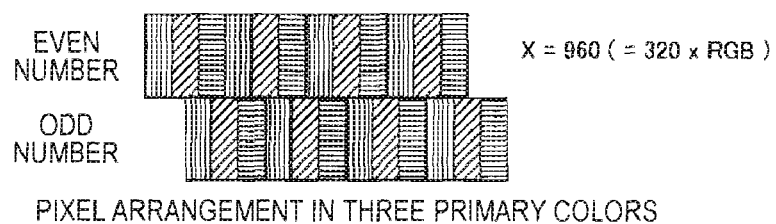
FIGS. 7A and 7B are diagrams showing a pixel arrangement for explaining a sub-pixel process in the first embodiment.
Figure 7B:
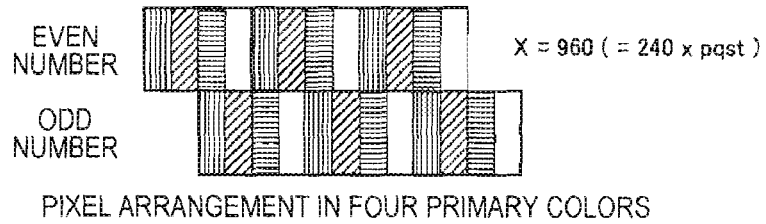

FIGS. 7A and 7B are diagrams showing a pixel arrangement for explaining the sub-pixel process in the first embodiment. FIG. 7A shows the pixel arrangement in the three primary colors R, G, and B, and FIG. 7B shows the pixel arrangement in the four primary colors p, q, s, and t. According to FIGS. 7A and 7B, it proves that the display pixels are arranged so that the pixel arrangement in an even line of the scan lines and the pixel arrangement in an odd line thereof are shifted a half pitch of the display pixel unit from each other. In other words, it proves that the display pixels are arranged in a delta arrangement.

In the first embodiment, the image processing circuit 12 obtains the image data of the three primary colors R, G, and B composed of totally 960 dots (assuming that "a dot" corresponds to the sub-pixel) in 320 pixels (320 display pixels) per scan line, and outputs the image data of the four primary colors p, q, s, and t composed of totally 960 dots in 240 pixels (240 display pixels). In other words, the image processing circuit 12 (specifically, the color conversion circuit 121 and the sub-pixel processing circuit 122) generates the four primary colors p, q, s, and t with the same total number of data (specifically 960 dots) as in the three primary colors R, G, and B input thereto. In other words, the four primary colors p, q, s, and t with the same total number of sub-pixels as the total number of sub-pixels in the three primary colors R, G, and B.

FIG. 8 is a diagram specifically showing change in the number of dots when executing the color conversion process and the sub-pixel process in the first embodiment. In this case, the color conversion circuit 121 obtains the image data of the three primary colors R, G, and B composed of totally 960 dots in 320 pixels per scan line. The color conversion circuit 121 generates the image data of the four primary colors P, Q, S, and T composed of totally 1280 dots in 320 pixels from the image data of the three primary colors R, G, and B composed of totally 960 dots in 320 pixels. In other words, the color conversion circuit 121 performs the color conversion process from the three primary colors R, G, and B to the four primary colors P, Q, S, and T while maintaining the number of the display pixels (320 pixels) in the three primary colors R, G, and B.

The sub-pixel processing circuit 122 obtains the image data of the four primary colors P, Q, S, and T composed of totally 1280 dots in 320 pixels per scan line, and generates the image data of the four primary colors p, q, s, and t composed of totally 960 dots in 240 pixels from the image data of the four primary colors P, Q, S, and T. In this case, the sub-pixel processing circuit 122 is not allowed to directly assign the data of the four primary colors P, Q, S, and T on which the color conversion process has already been executed in the case of disposing the data to the same pixel arrangement as the four primary colors, and consequently, the sub-pixel processing circuit 122 reduces the number of the color units from 320 pixels to 240 pixels, which corresponds a magnification of 0.75 (in other words, reduces the number of display pixels from 320 pixels to 240 pixels, which corresponds to a magnification of 0.75). When the number of the color units is reduced from 320 pixels to 240 pixels, which corresponds to a magnification or 0.75, the resolution in the color units is apt to be lowered. Therefore, the sub-pixel processing circuit 122 performs the sub-pixel process so that the degradation of the color resolution is prevented from occurring. It should be noted that the four primary colors p, q, s, and t thus generated by the sub-pixel processing circuit 122 are supplied to the display section 20.

Here, the reason why the totally 960 dots in the 240 pixels are arranged as the four primary colors p, q, s, and t in the first embodiment will be explained. As shown in FIGS. 7A and 7B, the total number of dots (the total number of data) in the 240 pixels of the four primary colors p, q, s, and t is 960, which is the same as that in the 320 pixels of the three primary colors R, G, and B. Therefore, by arranging the four primary colors p, q, s, and t as described above, the pixel layout of the three primary colors used generally can directly be used, thus it becomes possible to improve the design efficiency. Further, in the case in which 240 pixels are arranged as the four primary colors p, q, s, and t, the pixel density is lowered, thus the aperture ratio can be increased in comparison with the case of arranging 320 pixels as the four primary colors p, q, s, and t. Therefore, if, for example, display is performed using red, green, blue, and white as the four primary colors p, q, s, and t, the surface luminance can be prevented from being lowered, thus the bright display section 20 can be realized.

Then, with reference to FIG. 9A and 9B, the sub-pixel process executed by the sub-pixel processing circuit 122 will be explained. It should be noted that the sub-pixel process will be explained here exemplifying the case of generating the p, q, s, and t pixels in an even line.

FIGS. 9A and 9B are diagrams schematically showing the sub-pixel process when generating the p, q, s, and t pixels in an even line. FIG. 9A is a diagram showing the pixel arrangement of the four primary colors P, Q, S, and T (specifically, from "$P_0, Q_0, S_0, T_0$" to "$P_5, Q_5, S_5, T_5$") on which the color conversion process has already been executed, and FIG. 9B is a diagram showing the pixel arrangement of the four primary colors p, q, s, and t (specifically, from "$p_1, q_1, s_1, t_1$" to "$p_3, q_3, s_3, t_3$") on which the sub-pixel process has already been executed. It should be noted that in FIGS. 9A and 9B, the arrows reaching the four primary colors p, q, s, and t from the four primary colors P, Q, S, and T denote the sub-pixels of the four primary colors P, Q, S, and T looked-up when generating the data of the sub-pixels in the four primary colors p, q, s, and t.

The sub-pixel processing circuit 122 generates the image data of the four primary colors p, q, s, and t composed of 240 pixels per scan line from the image data of the four primary colors P, Q, S, and T composed of 320 pixels by executing the sub-pixel process. Specifically, the sub-pixel processing circuit 122, from a local viewpoint, performs the process of generating three pixels (three display pixels) in p, q, s, and t from four pixels (four display pixels) in P, Q, S, and T (it should be noted that the previous and next pixels of the four pixels in the P, Q, S, and T are partially used). In other words, the process for reducing the number of display pixels to be 0.75 times thereof is performed. In this case, the sub-pixel processing circuit 122 performs the interpolation process based on the relationship between the sub-pixel positions in the four primary colors P, Q, S, and T on which the color conversion process has been performed and the sub-pixel positions (i.e., positions of the primary color in the display section (the display panel 23)) in the four primary colors p, q, s, and t. In other words, the sub-pixel processing circuit 122 performs the interpolation process as the sub-pixel process.

Here, the interpolation process will specifically be explained. The sub-pixel processing circuit 122 performs the interpolation process by performing the weighted average calculation in accordance with the distance between the position of the sub-pixel in the four primary colors P, Q, S, and T and the position of the sub-pixel in the four primary colors p, q, s, and t assuming that the distance between the color pixels of the P, Q, S, and T is "1.0" (i.e., assuming that the size of one display pixel in the four primary colors P, Q, S, and T is "1.0"). More specifically, the data of one sub-pixel in the four primary colors p, q, s, and t is generated by referring to the data of one or two of the sub-pixels (specifically, one or two sub-pixels in the four primary colors P, Q, S, and T close to the sub-pixel in the four primary colors p, q, s, and t) in the four primary colors P, Q, S, and T. In this case, the sub-pixel processing circuit 122 generates the data of the sub-pixel in the p, q, s, and t by performing the interpolation process on the data of the sub-pixel in the four primary colors P, Q, S, and T corresponding to the color of the sub-pixel in the four primary colors p, q, s, and t to be obtained. In other words, the data of the p pixel is obtained from the data of the P pixels, and the data of the q pixel is obtained from the data of the Q pixels. In an explanation with one example, when generating the data of the $p_1$ forming the display pixel $p_1, q_1, s_1,$ and $t_1$ in the four primary colors p, q, s, and t, the data of $P_0$ and the data of $P_1$ respectively forming the two display pixels $P_0, Q_0, S_0,$ and $T_0$ and $P_1, Q_1, S_1,$ and $T_1$ in the four primary colors P, Q, S, and T are used. Further, when generating the data of the $p_2$ forming the display pixel $p_2, q_2, s_2,$ and $t_2$ in the four primary colors p, q, s, and t, only the data of $P_2$ forming the one display pixel $P_2, Q_2, S_2,$ and $T_2$ in the four primary colors P, Q, S, and T are used. By performing the interpolation process in a manner as described above, it becomes possible to reflect the positional information as the p, q, s, and t to the data to be generated, and to appropriately reduce the jaggies in the image contour. It should be noted that the interpolation method as described above is basically executed in a similar manner irrespective of whether the four primary colors p, q, s, and t to be generated are positioned on an even line or an odd line.

FIG. 10 is a diagram showing an interpolation coefficient (in other words, a weight used in executing the weighted average calculation) used in executing the interpolation process described above. In FIG. 10, the horizontal axis represents the distance between the position of the sub-pixel in the four primary colors P, Q, S, and T and the position of the sub-pixel in the four primary colors p, q, s, and t, and the vertical axis represents the interpolation coefficient. In this case, the interpolation coefficient can be obtained by a linear function defined by the distance between the position of the sub-pixel in the four primary colors P, Q, S, and T and the position of the sub-pixel in the four primary colors p, q, s, and t. In other words, the interpolation coefficient can be obtained by bilinear interpolation (or linear interpolation). In the first embodiment, since two distances of "1/3" and "−2/3" are obtained as the distance described above, two interpolation coefficients $C_1$ and $C_2$ respectively corresponding to these distances are used. It should be noted that "$C_1 = 2/3$" and "$C_2 = 1/3$" are assumed. It should be noted that the interpolation coefficients as described above are basically used in a similar manner irrespective of whether the four primary colors p, q, s, and t to be generated are positioned on an even line or an odd line.

Then, calculation in generating the p, q, s, and t pixels in an even line will specifically be explained with reference to FIGS. 11A through 11C, 12A through 12C, 13A through 13C, and 14A through 14C.

FIGS. 11A throuoh 11C are diagrams showing the calculation method for generating the data of the p pixels in an even line. FIG. 11A shows the pixel arrangement of the four primary colors P, Q, S, and T (specifically, from "$P_0, Q_0, S_0, T_0$" to "$P_5, Q_5, S_5, T_5$") on which the color conversion process has already been executed, and FIG. 11B shows the pixel arrangement of the four primary colors p, q, s, and t (specifically, from "$p_1, q_1, s_1, t_1$" to "$p_3, q_3, s_3, t_3$") on which the sub-pixel process has already been executed. It should be noted that the arrows reaching the four primary colors p, q, s, and t from the four primary colors P, Q, S, and T denote the sub-pixels in the four primary colors P, Q, S, and T used in generating the p pixels. Further, FIG. 11C shows a set of arithmetic expressions for generating the p pixels (specifically, $p_1, p_2,$ and $p_3$).

In this case, in order for generating the three sub-pixels $p_1, p_2,$ and $p_3$, four sub-pixels $P_1, P_2, P_3,$ and $P_4$ are looked-up (note that the $P_0$ in the previous pixel is also used when generating the $p_1$). For example, when the $p_1$ is generated, the $P_0$ and $P_1$ are used. In this case, the distance between the position in the $p_1$ and the position in the $P_0$ becomes "$-2/3$," and the distance between the position in the $p_1$ and the position in the $P_1$ becomes "$1/3$." When obtaining the interpolation coefficients respectively corresponding to these distances with reference to FIG. 10, the interpolation coefficient corresponding to the distance of "$-2/3$" becomes "$C_2=1/3$," the interpolation coefficient corresponding to the distance of "$1/3$" becomes "$C_1=2/3$." Therefore, the interpolation coefficient of "$C_2=1/3$" is used for the data of $P_0$, and the interpolation coefficient of "$C_1=2/3$" is used for the data of $P_1$. Thus, the operation (weighted average evaluation) for generating the $p_1$ is expressed by the formula shown in the upper column of FIG. 11C.

Similarly to the above, the arithmetic expression for generating the $p_2$ is expressed by the formula shown in the middle column of FIG. 11C. In this case, since the position in the $p_2$ and the position in the $P_2$ are identical to each other (i.e., the distance becomes "0"), the data of $P_2$ is directly used as the data of $p_2$. Further, the arithmetic expression for generating the $p_3$ is expressed by the formula shown in the lower column of FIG. 11C. In this case, the $p_3$ is generated by performing the weighted average calculation using the interpolation coefficient of "$C_1=2/3$" for the data of $P_3$ and the interpolation coefficient of "$C_2=1/3$" for the data of $P_4$.

FIGS. 12A through 12C are diagrams showing the calculation method for generating the data of the q pixels in an even line. FIG. 12A shows the pixel arrangement of the four primary colors P, Q, S, and T on which the color conversion process has already been executed, and FIG. 12B shows the pixel arrangement of the four primary colors p, q, s, and t on which the sub-pixel process has already been executed. It should be noted that the arrows reaching the four primary colors p, q, s, and t from the four primary colors P, Q, S, and T denote the sub-pixels in the four primary colors P, Q, S, and T used in generating the q pixels. Further, FIG. 12C shows a set of arithmetic expressions for generating the q pixels (specifically, $q_1, q_2,$ and $g_3$). Also in this case, the q pixels are generated by a similar method to the case of generating the p pixels described above.

FIGS. 13A through 13C are diagrams showing the calculation method for generating the data of the s pixels in an even line. FIG. 13A shows the pixel arrangement of the four primary colors P, Q, S, and T on which the color conversion process has already been executed, and FIG. 13B shows the pixel arrangement of the four primary colors p, q, s, and t on which the sub-pixel process has already been executed. It should be noted that the arrows reaching the four primary colors p, q, s, and t from the four primary colors P, Q, S, and T denote the sub-pixels in the four primary colors P, Q, S, and T used in generating the s pixels. Further, FIG. 13C shows a set of arithmetic expressions for generating the s pixels (specifically, $s_1, s_2,$ and $s_3$). Also in this case, the s pixels are generated by a similar method to the case of generating the p pixels described above.

FIGS. 14A through 14C are diagrams showing the calculation method for generating the data of the t pixels in an even line. FIG. 14A shows the pixel arrangement of the four primary colors P, Q, S, and T on which the color conversion process has already been executed, and FIG. 14B shows the pixel arrangement of the four primary colors p, q, s, and t on which the sub-pixel process has already been executed. It should be noted that the arrows reaching the four primary colors p, q, s, and t from the four primary colors P, Q, S, and T denote the sub-pixels in the four primary colors P, Q, S, and T used in generating the t pixels. Further, FIG. 14C shows a set of arithmetic expressions for generating the t pixels (specifically, $t_1, t_2,$ and $t_3$). Also in this case, the t pixels are generated by a similar method to the case of generating the p pixels described above.

Then, calculation in generating the p, q, s, and t pixels in an odd line will specifically be explained with reference to FIGS. 15A through 15C.

FIGS. 15A through 15C are diagrams showing the calculation method for generating the data of the p, q, s, and t pixels in an odd line. FIG. 15A shows the pixel arrangement of the four primary colors P, Q, S, and T on which the color conversion process has already been executed, and FIG. 15B shows the pixel arrangement of the four primary colors p, q, s, and t on which the sub-pixel process has already been executed. It should be noted that the arrows reaching the four primary colors p, q, s, and t from the four primary colors P, Q, S, and T denote the sub-pixels in the four primary colors P, Q, S, and T used in generating the p, q, s, and t pixels. Further, FIG. 15C shows sets of arithmetic expressions for generating all of the p, q, s, and t pixels (specifically, $p_1$ through $p_3$, $q_1$ through $q_3$, $s_1$ through $s_3$, and $t_1$ through $t_3$).

Also in the case of generating the data of the p, q, s, and t pixels in an odd line, the interpolation process is executed by a similar method to the method used in the case of generating the data of the p, q, s, and t pixels in an even line as described above. In other words, the pixels to be looked-up and the interpolation coefficients when executing the interpolation process are basically the same in both odd lines and even lines. It should be noted that since the display pixels are arranged so that the even lines and the odd lines are shifted a half pitch (two sub-pixel units) of the display pixel unit from each other, the even lines and the odd lines are different in the combination of the pixels to be looked-up and the interpolation coefficient when executing the interpolation process. In other words, the even lines and the odd lines are different in the sub-pixels in the four primary colors P, Q, S, and T close to the sub-pixels in the pour primary colors p, q, s, and t, and tend to be different in the distance therebetween even if the sub-pixels to be looked-up are the same. For example, while the pixels to be looked-up in generating the $p_1$ pixel in the even line are the $P_0$ pixel and the $P_1$ pixel (see FIG. 11C), the pixels to be looked-up in generating the $p_1$ pixel in the odd line become the $P_1$ pixel and the $P_2$ pixel (see FIG. 15C). Further, while the pixel to be looked-up in generating the $p_2$ pixel in the even line is only the $P_2$ pixel (see FIG. 11C), the pixels to be looked-up in generating the $p_2$ pixel in the odd line become the $P_2$ pixel and the $P_3$ pixel (see FIG. 15C). FIG. 15C shows the sets of arithmetic expressions in the interpolation process corresponding to all of the p, q, s, and t pixels.

It should be noted that the sub-pixel processing circuit 122 discriminates whether the four primary colors p, g, s, and t to be generated are positioned in the even line or in the odd line, thereby switching (in other words, switching the operation used in the interpolation process) the interpolation process to be executed as described above. For example, it is possible that the sub-pixel processing circuit 122 performs the discrimination based on the flag attached to every scan line for indicating whether the line is the even line or the odd line, and switches the interpolation process based on the result of the discrimination.

Further, the sub-pixel processing circuit 122 performs the interpolation process in accordance with the condition of the input data. Specifically, in accordance with the condition of the input data, the sub-pixel processing circuit 122 can switch between performing different operations in the interpolation processes respectively for the even lines and the odd lines and performing the same operation in the interpolation processes for both the even lines and the odd lines. More specifically, the sub-pixel processing circuit 122 performs the different operations in the interpolation process between the even lines and the odd lines as described above in the case in which the data is input, on which the process for shifting a half pitch has not been executed in a main system (e.g., CPU) side of an information device on which the image display device 100 is mounted. In contrast, when the data on which the process of shifting a half pitch has already been executed on the main system side is input, the sub-pixel processing circuit 122 performs the same operation in the interpolation process for both the even lines and the odd lines.

According to the sub-pixel process relating no the first embodiment of the invention described above, the detailed positional information as the four primary colors p, q, s, and t can be reflected to the data to be generated in both the even lines and the odd lines. Therefore, even in the case of performing shrinkage with a magnification of 0.75 from 320 pixels to 240 pixels in the color units when the display section 20 has the configuration having the even lines and the odd lines shifted a half pitch of the display pixel unit from each other (i.e., the display pixels are arranged in the delta arrangement), the detailed positional information of the four primary colors p, q, s, and t can be reflected, thus the jaggies in the image contour can appropriately be reduced. Further, when the data of the four primary colors p, q, s, and t thus generated according to the first embodiment is displayed on the display section 20 composed of the display pixels arranged to have the delta arrangement, the resolution in the scan line direction can artificially be improved.

Second Embodiment

A second embodiment of the invention will hereinafter be described. The second embodiment is different from the first embodiment described above in that the image processing circuit converts totally 480 dots of 160 pixels the three primary colors R, G, and B into totally 480 dots of 120 pixels in the four primary colors p, q, s, and t per scan line. In this case, shrinkage with a magnification of 0.75 from 160 pixels to 120 pixels in the color units per scan line is performed (in other words, the number of display pixels is reduced from 160 pixels to 120 pixels, which corresponds to the magnification of 0.75). When executing such shrinkage, the sub-pixel process is also executed also in the second embodiment. However, in contrast to the first embodiment described above in which the interpolation process (the bilinear interpolation) is executed in the sub-pixel process using the linear function, the second embodiment is different from the first embodiment in that the interpolation process (bicubic interpolation) is executed in the sub-pixel process using a cubic function.

FIGS. 16A and 16B are diagrams showing a pixel arrangement for explaining the sub-pixel process according to the second embodiment. FIG. 16A shows the pixel arrangement in the three primary colors R, G, and B, and FIG. 16B shows the pixel arrangement in the four primary colors p, q, s, and t.

According to FIGS. 16A and 16B, it proves that the display pixels are arranged so that the pixel arrangement in an even lie of the scan lines and the pixel arrangement in an odd line thereof are shifted a half pitch of the display pixel unit from each other. In other words, it proves that the display pixels are arranged in a delta arrangement.

In the second embodiment, the image data of the four primary colors p, q, s, and t composed of totally 480 dots in 120 pixels (120 display pixels) is generated from the image data of the three primary colors R, G, and B composed of totally 480 dots in 160 pixels (160 display pixels) per scan line. In other words, there are generated the four primary colors p, q, s, and t with the same number of data (specifically, 480 dots) as in the three primary colors R, G, and B input thereto.

FIG. 17 is a diagram specifically showing change in the number of dots when executing the color conversion process and the sub-pixel process in the second embodiment. In the second embodiment, a color conversion circuit 12a1 an image processing circuit 12a performs the color conversion process, and a sub-pixel processing circuit 12a2 in the image processing circuit 12a performs the sub-pixel process. It should be noted that the image processing circuit 12a can be applied to the image display device 100 instead of the image processing circuit 12 described above (see FIG. 1).

In the second embodiment, the color conversion circuit 12a1 obtains the image data of the three primary colors R, G, and B composed of totally 480 dots in 160 pixels per scan line. For example, the color conversion circuit 12a1 obtains the image data on which the process for reducing the image data of the three primary colors R, G, and B composed of totally 960 dots in 320 pixels by half, for example, has already been executed. The color conversion circuit 12a1 generates the image data of the four primary colors P, Q, S, and T composed of totally 640 dots in 160 pixels from the image data of the three primary colors R, G, and B composed of totally 480 dots in 160 pixels per scan line. In other words, the color conversion circuit 12a1 performs the conversion process from the three primary colors R, G, and B to the four primary colors P, Q, S, and T while maintaining the number of the display pixels (160 pixels) in the three primary colors R, G, and B.

The sub-pixel processing circuit 12a2 obtains the image data of the four primary colors P, Q, S, and T composed of totally 640 dots in 160 pixels per scan line, and generates the image data of the four primary colors p, q, s, and t composed of totally 480 dots in 120 pixels from the image data of the four primary colors P, Q, S, and T. In this case, the sub-pixel processing circuit 12a2 is not allowed to directly assign the data of the four primary colors P, Q, S, and T on which the color conversion process has already been executed in the case of disposing the data to the same pixel arrangement as the four primary colors, and consequently, the sub-pixel processing circuit 12a2 reduces the number of the color units from 160 pixels to 120 pixels, which corresponds a magnification of 0.75 (in other words, reduces the number of display pixels from 160 pixels to 120 pixels, which corresponds to a magnification of 0.75). When the number of the color units is reduced from 160 pixels to 120 pixels, which corresponds to a magnification of 0.75, the resolution in the color units is apt to be lowered. Therefore, the sub-pixel processing circuit 12a2 performs the sub-pixel process so that the degradation of the color resolution is prevented from occurring. In other words, the sub-pixel processing circuit 12a2 performs the interpolation process as described above. It should be noted that the four primary colors p, q, s, and t thus generated by the sub-pixel processing circuit 12a2 are supplied to the display section 20.

Here, the reason why the totally 480 dots in the 120 pixels are arranged as the four primary colors p, q, s, and t in the second embodiment will be explained. As shown in FIGS. 16A and 16B, the total number of dots (the total number of data) in the 120 pixels of the four primary colors p, q, s, and t is 480, which is the same as that in the 160 pixels of the three primary colors R, G, and B. Therefore, by arranging the four primary colors p, q, s, and t as described above, the pixel layout of the three primary colors used generally can directly be used, thus it becomes possible to improve the design efficiency. Further, in the case in which 120 pixels are arranged as the four primary colors p, q, s, and t, the pixel density is lowered, thus the aperture ratio can be increased in comparison with the case of arranging 160 pixels as the four primary colors p, q, s, and t. Therefore, if, for example, display is performed using red, green, blue, and white as the four primary colors p, q, s, and t, the surface luminance can be prevented from being lowered, thus the bright display section 20 can be realized.

Then, with reference to FIGS. 18A and 18B, the sub-pixel process executed by the sub-pixel processing circuit 12a2 will be explained. It should be noted that the sub-pixel process will be explained here exemplifying the case of generating the p, q, s, and t pixels in an even line.

FIGS. 18A and 18B are diagrams schematically showing the sub-pixel process when generating the p, q, s, and t pixels in an even line. FIG. 18A is a diagram showing the pixel arrangement of the four primary colors P, Q, S, and T (specifically, from "$P_{-1}$, $Q_{-1}$, $S_{-1}$, $T_{-1}$," to "$P_6$, $Q_6$, $S_6$, $T_6$,") on which the color conversion process has already been executed, and FIG. 18B is a diagram showing the pixel arrangement of the four primary colors p, q, s, and t (specifically, from "$p_1$, $q_1$, $s_1$, $t_1$," to "$p_3$, $q_3$, $s_3$, $t_3$") on which the sub-pixel process has already been executed. It should be noted that in FIGS. 18A and 18B, the arrows reaching the four primary colors p, q, s, and t from the four primary colors P, Q, S, and T denote the sub-pixels of the four primary colors P, Q, S, and T looked-up when generating the data of the sub-pixels in the four primary colors p, q, s, and t.

The sub-pixel processing circuit 12a2 generates the image data of the four primary colors p, q, s, and t composed of 120 pixels per scan line from the image data of the four primary colors P, Q, S, and T composed of 160 pixels. Specifically, from a local viewpoint, the sub-pixel processing circuit 12a2 performs the process of generating three pixels (three display pixels) in p, q, s, and t from four pixels (four display pixels) in P, Q, S, and T (it should be noted that the previous two pixels and next two pixels of the four pixels in the P, Q, S, and T are partially used). In this case, the sub-pixel processing circuit 12a2 performs the interpolation process based on the relationship between the sub-pixel positions in the four primary colors P, Q, S, and T on which the color conversion process has been performed and the sub-pixel positions (i.e., positions of the primary color in the display section 20 (the display panel 23)) in the four primary colors p, q, s, and t.

Specifically, the sub-pixel processing circuit 12a2 performs the interpolation process by performing the weighted average calculation in accordance with the distance between the position of the sub-pixel in the four primary colors P, Q, S, and T and the position of the sub-pixel in the four primary colors p, q, s, and t assuming that the distance between the color pixels of the P, Q, S, and T is "1.0" (i.e., assuming that the size of one display pixel in the four primary colors P, Q, S, and T is "1.0"). More specifically, the data of one sub-pixel in the four primary colors p, q, s, and t is generated by referring to the data of one or four of the sub-pixels (specifically, the sub-pixels in the four primary colors P, Q, S, and T close to the sub-pixel in the four primary colors p, q, s, and t) in the four primary colors P, Q, S, and T. In this case, the sub-pixel processing circuit 12a2 generates the data of the sub-pixel in the p, q, s, and t by performing the interpolation process on the data of the sub-pixel in the four primary colors P, Q, S, and T corresponding to the color of the sub-pixel in the four primary colors p, q, s, and t to be obtained. In other words, the data of the p pixel is obtained from the data of the P pixels, and the data of the q pixel is obtained from the data of the Q pixels. In an explanation with one example, when generating the data of the $p_1$ forming the display pixel $p_1$, $q_1$, $s_1$, and $t_1$ in the four primary colors p, q, s, and t, the four pieces of data $P_{-1}$ through $P_2$ respectively forming the four display pixels $P_{-1}$, $Q_{-1}$, $S_{-1}$, and $T_{-1}$, through $P_2$, $Q_2$, $S_2$, and $T_2$ in the four primary colors P, Q, S, and T are used. Further, when generating the data of the $p_2$ forming the display pixel $p_2$, $q_2$, $s_2$, and $t_2$ in the four primary colors p, q, s, and t, only the data of $P_2$ forming the one display pixel $P_2$, $Q_2$, $S_2$, and $T_2$ in the four primary colors P, Q, S, and T are used. It should be noted that the interpolation method as described above is basically executed in a similar manner irrespective of whether the four primary colors p, q, s, and t to be generated are positioned on an even line or an odd line.

FIG. 19 is a diagram showing an interpolation coefficient (in other words, a weight used in executing the weighted average calculation) used in executing the interpolation process described above. In FIG. 19, the horizontal axis represents the distance between the position of the sub-pixel in the four primary colors P, Q, S, and T and the position of the sub-pixel in the four primary colors p, q, s, and t, and the vertical axis represents the interpolation coefficient. In this case, the interpolation coefficient can be obtained by a cubic function defined by the distance between the position of the sub-pixel in the four primary colors P, Q, S, and T and the position of the sub-pixel in the four primary colors p, q, s, and t. In other words, the interpolation coefficients are obtained by the bicubic interpolation (cubic convolution interpolation). In the second embodiment, since four distances of "1/3," "–2/3," "4/3," and "–5/3" are obtained as the distance described above, four interpolation coefficients $E_1$, $E_2$, $E_3$, and $E_4$ respectively corresponding to these distances are used. It should be noted that the $E_1$ through $E_4$ are obtained along Formula 1 described below. Further, "x" in Formula 1 is substituted with the distance.

$$E(x) = \begin{cases} 1 - 2|x|^2 + |x|^3 & (0 \le |x| < 1) \\ 4 - 8|x| + 5|x|^2 - |x|^3 & (1 \le |x| < 2) \\ 0 & (2 \le |x|) \end{cases} \quad \text{Formula 1}$$

By performing the interpolation process (the bicubic interpolation) using the cubic function as described above, "blur" which can be caused in the image obtained by the interpolation process can better be prevented in comparison with the case of executing the interpolation process (the bilinear interpolation) using the linear function as shown in the first embodiment described above. In other words, since in the second embodiment, the number of pixels in the scan line direction is smaller than that in the first embodiment, and the resolution tends to be lowered, the bicubic interpolation capable of efficiently suppressing the "blur" described above is executed in order for maintaining the resolution. It should be noted that the interpolation coefficients as described above are basically used in a similar wanner irrespective of whether the four primary colors p, q, s, and t to be generated are positioned on an even line or an odd line.

Then, calculation in generating the p, q, s, and t pixels in an even line will specifically be explained with reference to FIGS. 20A through 20C, 21A through 21C, 22A throuoh 22C, and 23A throuoh 23C.

FIGS. 20A through 20C are diagrams showing the calculation method for generating the data of the p pixels in an even line. FIG. 20A shows the pixel arrangement of the four primary colors P, Q, S, and T (specifically, from "$P_{-1}$, $Q_{-1}$, $S_{-1}$, $T_{-1}$" to "$P_6$, $Q_6$, $S_6$, $T_6$") on which the color conversion process has already been executed, and FIG. 20B shows the pixel arrangement of the four primary colors p, q, s, and t (specifically, from "$p_1$, $q_1$, $s_1$, $t_1$" to "$p_3$, $q_3$, $s_3$, $t_3$") on which the sub-pixel process has already been executed. It should be noted that the arrows reaching the four primary colors p, q, s, and t from the four primary colors P, Q, S, and T denote the sub-pixels in the four primary colors P, Q, S, and T used in generating the p pixels. Further, FIG. 20C shows a set of arithmetic expressions for generating the p pixels (specifically, $p_1$, $p_2$, and $p_3$).

In the second embodiment, in order for generating the three sub-pixels $p_1$, $p_2$, and $p_3$, six sub-pixels $P_0$, $P_1$, $P_2$, $P_3$, $P_4$, and $P_5$ are looked-up (note that the $P_{-1}$ in the previous pixel is also used when generating the $p_1$). For example, when the $p_1$ is generated, the $P_{-1}$, $P_0$, $P_1$, and $P_2$ are used. In this case, the distance between the position in the $p_1$ and the position in the $P_{-1}$ becomes "−5/3," the distance between the position in the $p_1$ and the position in the $P_0$ becomes "−2/3," the distance between the position in the $p_1$ and the position in the $P_1$ becomes "1/3," and the distance between the position in the $p_1$ and the position in the $P_2$ becomes "4/3." When obtaining the interpolation coefficients respectively corresponding to these distances with reference to FIG. 19, the interpolation coefficient corresponding to the distance of "−5/3" becomes $E_4$, the interpolation coefficient corresponding to the distance of "−2/3" becomes $E_2$, the interpolation coefficient corresponding to the distance of "1/3" becomes $E_1$, and the interpolation coefficient corresponding to the distance of "4/3" becomes $E_3$. Therefore, $E_4$ is used for the $P_{-1}$ data as the interpolation coefficient, $E_2$ is used for the $P_0$ data as the interpolation coefficient, $E_1$ is used for the $P_1$ data as the interpolation coefficient, and $E_3$ is used for the $P_2$ data as the interpolation coefficient. Thus, the operation (the weighted average calculation) for generating the $p_1$ is expressed by the arithmetic expression shown in the upper column of FIG. 20C.

It should be noted that in contrast to the first embodiment in which the data in the $p_1$ is obtained by two multiplications and one addition (see FIG. 11C), in the second embodiment, the data in the $p_1$ is obtained by four multiplications and three additions. In other words, in the second embodiment, the number of the pixels looked-up in executing the interpolation process in the sub-pixel process is increased from that in the first embodiment.

Similarly to the above, the arithmetic expression for generating the $p_2$ is expressed by the formula shown in the middle column of FIG. 20C. In this case, since the position in the $p_2$ and the position in the $P_2$ are identical to each other (i.e., the distance becomes "0"), the data of $P_2$ is directly used as the data of $p_2$. Further, the arithmetic expression for generating the $p_3$ is expressed by the formula shown in the lower column of FIG. 20C. In this case, $p_3$ is generated by executing the weighted average calculation with the $E_3$ used for the $P_2$ data as the interpolation coefficient, the $E_1$ used for the $P_3$ data as the interpolation coefficient, the $E_2$ used for the $P_4$ data as the interpolation coefficient, and the $E_4$ used for the $P_5$ data as the interpolation coefficient.

FIGS. 21A through 21C are diagrams showing the calculation method for generating the data of the q pixels in an even line. FIG. 21A shows the pixel arrangement of the four primary colors P, Q, S, and T on which the color conversion process has already been executed, and FIG. 21B shows the pixel arrangement of the four primary colors p, q, s, and t on which the sub-pixel process has already been executed. It should be noted that the arrows reaching the four primary colors p, q, s, and t from the four primary colors P, Q, S, and T denote the sub-pixels in the four primary colors P, Q, S, and T used in generating the q pixels. Further, FIG. 21C shows a set of arithmetic expressions for generating the q pixels (specifically, $q_1$, $q_2$, and $q_3$). Also in this case, the q pixels are generated by a similar method to the case of generating the p pixels described above.

FIGS. 22A through 22C are diagrams showing the calculation method for generating the data of the s pixels in an even line. FIG. 22A shows the pixel arrangement of the four primary colors P, Q, S, and T on which the color conversion process has already been executed, and FIG. 22B shows the pixel arrangement of the four primary colors p, q, s, and t on which the sub-pixel process has already been executed. It should be noted that the arrows reaching the four primary colors p, q, s, and t from the four primary colors P, Q, S, and T denote the sub-pixels in the four primary colors P, Q, S, and T used in generating the s pixels. Further, FIG. 22C shows a set of arithmetic expressions for generating the s pixels (specifically, $s_1$, $s_2$, and $s_3$). Also in this case, the s pixels are generated by a similar method to the case of generating the p pixels described above.

FIGS. 23A through 23C are diagrams showing the calculation method for generating the data of the t pixels in an even line. FIG. 23A shows the pixel arrangement of the four primary colors P, Q, S, and T on which the color conversion process has already been executed, and FIG. 23B shows the pixel arrangement of the four primary colors p, q, s, and t on which the sub-pixel process has already been executed. It should be noted that the arrows reaching the four primary colors p, q, s, and t from the four primary colors P, Q, S, and T denote the sub-pixels in the four primary colors P, Q, S, and T used in generating the t pixels. Further, FIG. 23C shows a set of arithmetic expressions for generating the t pixels (specifically, $t_1$, $t_2$, and $t_3$). Also in this case, the t pixels are generated by a similar method to the case of generating the p pixels described above.

Then, calculation in generating the p, q, s, and t-pixels in an odd line will specifically be explained with reference to FIGS. 24A through 24C.

FIGS. 24A through 24C are diagrams showing the calculation method for generating the data of the p, q, s, and t-pixels in an odd line. FIG. 24A shows the pixel arrangement of the four primary colors P, Q, S, and T on which the color conversion process has already been executed, and FIG. 24B shows the pixel arrangement of the four primary colors p, q, s, and t on which the sub-pixel process has already been executed. It should be noted that the arrows reaching the four primary colors p, q, s, and t from the four primary colors P, Q, S, and T denote the sub-pixels in the four primary colors P, Q, S, and T used in generating the p, q, s, and t-pixels. Further, FIG. 24C shows sets of arithmetic expressions for generating all of the p, q, s, and t pixels (specifically, $p_1$ through $p_3$, $q_1$ through $q_3$, $s_1$ through $s_3$, and $t_1$ through $t_3$).

Also in the case of generating the data of the p, q, s, and t-pixels in an odd line, the interpolation process is executed by a similar method to the method used in the case of generating the data of the p, q, s, and t-pixels in an even line as described above. In other words, the pixels to be looked-up and the interpolation coefficients when executing the interpolation process are basically the same in both odd lines and even lines. It should be noted that since the display pixels are arranged so that the even lines and the odd lines are shifted a half pitch (two sub-pixel units) of the display pixel unit from each other, the even lines and the odd lines are different in the combination of the pixels to be looked-up and the interpolation coefficient when executing the interpolation process. In other words, the even lines and the odd lines are different in the sub-pixels in the four primary colors P, Q, S, and T close to the sub-pixels in the four primary colors p, q, s, and t, and tend to be different in the distance therebetween even if the sub-pixels to be looked-up are the same. For example, while the pixels to be looked-up in generating the $p_1$ pixel in the even line are the $P_{-1}, P_0, P_1$, and $P_2$ pixels (see FIG. 20C), the pixels to be looked-up in generating the $p_1$ pixel in the odd line become the $P_0, P_1, P_2$, and $P_3$ pixels (see FIG. 24C). FIG. 24C shows the sets of arithmetic expressions in the interpolation process corresponding to all of the p, q, s, and t pixels.

It should be noted that in accordance with the condition of the input data, the sub-pixel processing circuit 12a2 can switch between performing different operations in the interpolation processes respectively for the even lines and the odd lines and performing the same operation in the interpolation processes for both the even lines and the odd lines similarly to the sub-pixel processing circuit 122 described above. In other words, the sub-pixel processing circuit 12a2 performs the different operations in the interpolation process between the even lines and the odd lines in the case in which the data is input, on which the process for shifting a half pitch has not been executed in a main system (e.g., CPU) side of an information device on which the image display device 100 is mounted, and when the data on which the process of shifting a half pitch has already been executed on the main system side is input, the sub-pixel processing circuit 12a2 performs the same operation in the interpolation process for both the even lines and the odd lines.

According to the sub-pixel process relating to the second embodiment of the invention described above, when the display section 20 has the configuration having the even lines and the odd lines shifted a half pitch of the display pixel unit from each other (i.e., the display pixels are arranged in the delta arrangement), the detailed positional information of the four primary colors p, q, s, and t can be reflected, thus the jaggies in the image contour can appropriately be reduced while performing color reproduction in the four primary color display. In particular, according to the second embodiment, in the case in which the shrinkage with a magnification of 0.75 from 160 pixels to 120 pixels is performed as the case with the small number of pixels in the scan line direction, the detailed positional information of the p, q, s, and t can be reflected using the bicubic interpolation, and consequently, the jaggies in the image contour can efficiently foe reduced. Further, since in the second embodiment, the increased number of pixels are looked-up and the appropriately designed interpolation coefficients are used when the bicubic interpolation is performed in the sub-pixel process, the "blur" caused in the display image can efficiently be suppressed. In addition, also by the second embodiment, the resolution in the scan line direction can artificially be improved.

Third Embodiment

A third embodiment of the invention will hereinafter be explained. The third embodiment is the same as the first embodiment in that the image processing circuit obtains totally 960 dots in 320 pixels as the three primary colors R, G, and B, and is different from the first embodiment described above in that the image processing circuit generates totally 1280 dots in 320 pixels as the four primary colors p, q, s, and t from totally 1280 dots in 320 pixels as the four primary colors P, Q, S, and T on which the color conversion process has already been executed. In other words, although in the first and the second embodiments, the same total number of four primary colors p, q, s, and t as that of the three primary colors R, G, and B input thereto are generated, in the third embodiment, the different total number of four primary colors p, q, s, and t from that of the three primary colors R, G, and B input thereto are generated. In this case, in the third embodiment, the same number of four colors p, q, s, and t as the number of the display pixels in the three primary colors R, G, and B input thereto are generated. In other words, in the third embodiment, instead of reducing the number of display pixels in the four primary colors P, Q, S, and T, the four primary colors p, q, s, and t having the same number of display pixels as that of the four primary colors P, Q, S, and T are generated. Such a process is executed for obtaining an advantage of maintaining a feeling of resolution in the scan line direction.

Further, also in the third embodiment, the data in which even lines and odd lines are shifted a half pitch of the display pixel unit from each other is generated as the four primary colors p, q, s, and t. Specifically, by performing the interpolation process on the four primary colors P, Q, S, and T, the four primary colors p, q, s, and t having even lines and odd lines shifted a half pitch of the display pixel unit from each other are generated. More specifically, since in the third embodiment, the number of the display pixels of the four primary colors p, q, s, and t to be generated is the same as that of the four primary colors P, Q, S, and T, only the four primary colors p, q, s, and t positioned in an odd line are generated by the interpolation process. In other words, in the case in which the four primary colors p, q, s, and are positioned in an even line, the four primary colors p, q, s, and t are generated directly using the data of the four primary colors P, Q, S, and T, and in the case in which the four primary colors p, q, s, and t are positioned in an odd line, the four primary colors p, q, s, and t are generated executing the interpolation process on the four primary colors P, Q, S, and T. That is, in order for shifting the odd lines a half pitch, only the four primary colors p, q, s, and t positioned in the odd lines are generated by the interpolation process.

Figure 25A:
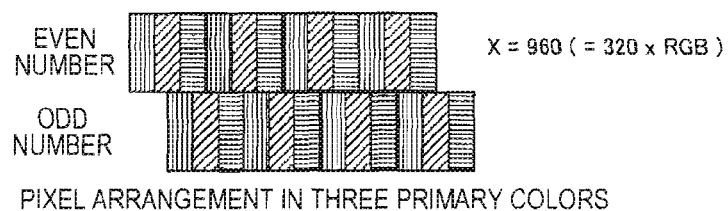
FIGS. 25A and 25B are diagrams showing a pixel arrangement for explaining a sub-pixel process in a third embodiment.
Figure 25B:
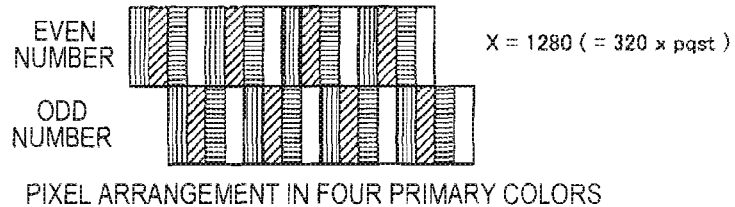

FIGS. 25A and 25B are diagrams showing a pixel arrangement for explaining the sub-pixel process according to the third embodiment. FIG. 25A shows the pixel arrangement in the three primary colors R, G, and B, and FIG. 25B shows the pixel arrangement in the four primary colors p, q, s, and t. According to FIGS. 25A and 25B, it proves that the display pixels are arranged so that the pixel arrangement in an even line of the scan lines and the pixel arrangement in an odd line thereof are shifted a half pitch of the display pixel unit from each other. In other words, it proves that the display pixels are arranged in a delta arrangement. In the third embodiment, the image data of the four primary colors composed of totally 1280 dots in 320 pixels (320 display pixels) is generated from the image data of the three primary colors R, G, and B composed of totally 960 dots in 320 pixels (320 display pixels) per scan line.

Figure 26:
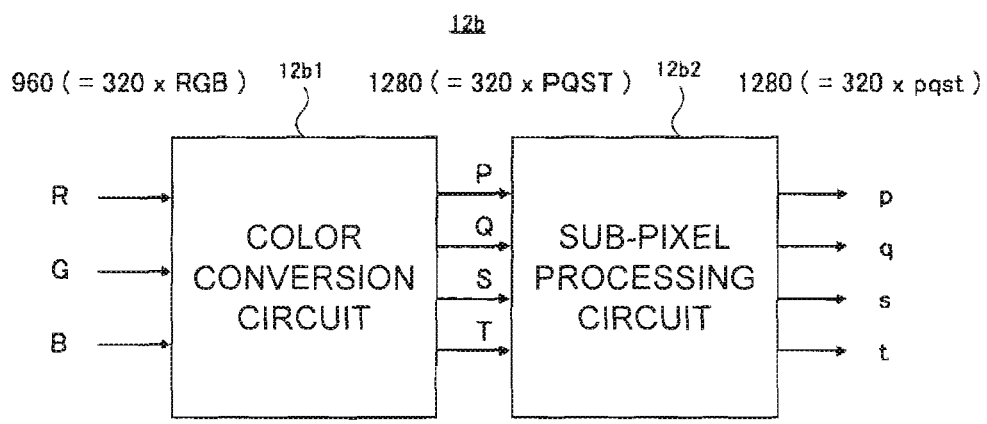
FIG. 26 is a diagram showing change in the number of dots when executing the color conversion process and the sub-pixel process in the third embodiment.

FIG. 26 is a diagram specifically showing change in the number of dots when executing the color conversion process and the sub-pixel process in the third embodiment. In the third embodiment, a color conversion circuit 12b1 in an image processing circuit 12b performs the color conversion process, and a sub-pixel processing circuit 12b2 in the image processing circuit 12b performs the sub-pixel process. It should be noted that the image processing circuit 12b can be applied to the image display device 100 instead of the image processing circuit 12 described above (see FIG. 1).

The color conversion circuit 12b1 obtains the image data of the three primary colors R, G, and B composed of totally 960 dots in 320 pixels per scan line. Then the color conversion circuit 12b1 generates the image data of the four primary colors P, Q, S, and T composed of totally 1280 dots in 320 pixels from the image data of the three primary colors R, G, and B composed of totally 960 dots in 320 pixels. In other words, the color conversion circuit 12b1 performs the conversion process from the three primary colors R, G, and B to the four primary colors P, Q, S, and T while maintaining the number of the display pixels (320 pixels) in the three primary colors R, G, and B.

The sub-pixel processing circuit 12b2 obtains the image data of the four primary colors P, Q, S, and T composed of totally 1280 dots in 320 pixels per scan line, and generates the image data of the four primary colors p, q, s, and t composed of totally 1280 dots in 320 pixels from the image data of the four primary colors P, Q, S, and T. In short, the four primary colors p, q, s, and t with the same number of display pixels as that of the four primary colors P, Q, S, and T are generated. By thus forming the four primary colors p, q, s, and t, although the total number of dots becomes greater than that of the three primary colors R, G, and B, the advantage of maintaining the feeling of the resolution in the scan line direction can be obtained. It should be noted that the four primary colors p, q, s, and t thus generated by the sub-pixel processing circuit 12b2 are supplied to the display section 20.

Then, with reference to FIGS. 27A, 27B, 28A, and 28B, the sub-pixel process executed by the sub-pixel processing circuit 12b2 will be explained.

Figure 27A:
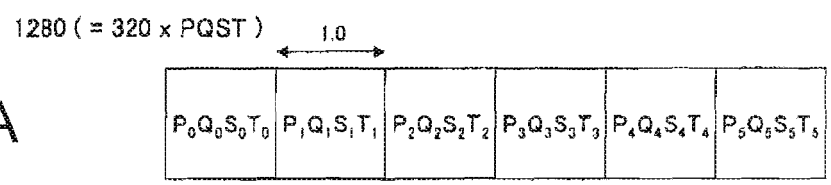
FIGS. 27A and 27B are diagrams showing an outline of the sub-pixel process in even lines in the third embodiment.
Figure 27B:
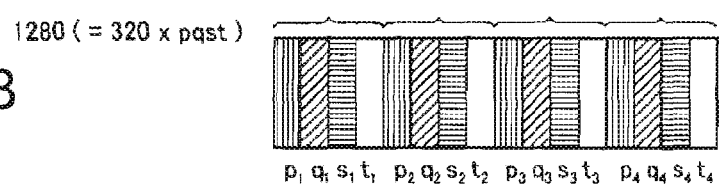

FIGS. 27A and 27B are diagrams schematicaly showing the sub-pixel process when generating the p, q, s, and t pixels in an even line. FIG. 27A is a diagram showing the pixel arrangement of the four primary colors P, Q, S, and T (specifically, from "$P_0, Q_0, S_0, T_0$" to "$P_5, Q_5, S_5, T_5$") on which the color conversion process has already been executed, and FIG. 27B is a diagram showing the pixel arrangement of the four primary colors p, q, s, and t (specifically, from "$p_1, q_1, s_1, t_1$" to "$p_4, q_4, s_4, t_4$") on which the sub-pixel process has already been executed. It should be noted that in FIGS. 27A and 27B, the arrows reaching the four primary colors p, q, s, and t from the four primary colors P, Q, S, and T denote the sub-pixels of the four primary colors P, Q, S, and T looked-up when generating the data of the sub-pixels in the four primary colors p, q, s, and t.

As shown in FIGS. 27A and 27B, since in the third embodiment, the number of the display pixels of the four primary colors p, q, s, and t to be generated is the same as that of the four primary colors P, Q, S, and T, if the four primary colors p, q, s, and t are positioned in an even line, the process of directly using the four primary colors P, Q, S, find T, on which the color conversion process has already been executed, is performed. Specifically, the sub-pixel processing circuit 12b2 directly uses the data of the sub-pixel in the four primary colors P, Q, S, and T corresponding to the color of the sub-pixel in the four primary colors p, q, s, and t to be obtained as the data of the sub-pixel in the p, q, s, and t.

FIGS. 28A and 28B are diagrams schematically showing the sub-pixel process when generating the p, q, s, and t pixels in an odd line. FIG. 28A is a diagram showing the pixel arrangement of the four primary colors P, Q, S, and T (specifically, from "$P_0, Q_0, S_0, T_0$" to "$P_5, Q_5, S_5, T_5$") on which the color conversion process has already been executed, and FIG. 28B is a diagram showing the pixel arrangement of the four primary colors p, q, s, and t (specifically, from "$p_1, q_1, s_1, t_1$" to "$p_3, q_3, s_3, t_3$") on which the sub-pixel process has already been executed. It should be noted that in FIGS. 28A and 28B, the arrows reaching the four primary colors p, q, s, and t from the four primary colors P, Q, S, and T denote the sub-pixels of the four primary colors P, Q, S, and T looked-up when generating the data of the sub-pixels in the four primary colors p, q, s, and t.

In the third embodiment, in order for generating the data of the four primary colors p, q, s, and t having the even lines and the odd lines shifted a half pitch of the display pixel unit from each other, only the p, q, s, and t pixels in the odd lines are generated by the interpolation process. In other words, as described above, the p, q, s, and t pixels in the even lines are generated directly using the data of the four primary colors P, Q, S, and T, and the p, q, s, and t pixels in the odd lines are generated by the interpolation process.

Specifically, the sub-pixel processing circuit 12b2 generates the image data of the four primary colors p, q, s, and t composed of 320 pixels per scan line from the image data of the four primary colors P, Q, S, and T composed of 320 pixels. In this case, the sub-pixel processing circuit 12b2 performs the interpolation process based on the relationship between the sub-pixel positions in the four primary colors P, Q, S, and T on which the color conversion process has been performed and the sub-pixel positions in the four primary colors p, q, s, and t.

Specifically, the sub-pixel processing circuit 12b2 performs the interpolation process by performing the weighted average calculation in accordance with the distance between the position of the sub-pixel in the four primary colors P, Q, S, and T and the position of the sub-pixel in the four primary colors p, q, s, and t assuming that the distance between the color pixels of the P, Q, S, and T is "1.0." More specifically, the data of one sub-pixel in the four primary colors p, q, s, and t is generated by referring to the data of two of the sub-pixels (specfically, the sub-pixels in the four primary colors P, Q, S, and T close to the sub-pixel in the four primary colors p, q, s, and t) in the four primary colors P, Q, S, and T. In this case, the sub-pixel processing circuit 12b2 generates the data of the sub-pixel in the p, q, s, and t by performing the interpolation process on the data of the sub-pixel in the four primary colors P, Q, S, and T corresponding to the color of the sub-pixel in the four primary colors p, q, s, and t to be obtained. In other words, the data of the p pixel is obtained from the data of the P pixels, and the data of the q pixel is obtained from the data of the Q pixels.

FIG. 29 is a diagram showing an interpolation coefficient (in other words, a weight used in executing the weighted average calculation) used in executing the interpolation process described above. In FIG. 29, the horizontal axis represents the distance between the position of the sub-pixel in the four primary colors P, Q, S, and T and the position of the sub-pixel in the four primary colors p, q, s, and t, and the vertical axis represents the interpolation coefficient. In this case, the interpolation coefficient can be obtained by a linear function defined by the distance between the position of the sub-pixel in the four primary colors P, Q, S, and T and the position of the sub-pixel in the four primary colors p, q, s, and t. In other words, the interpolation coefficient can be obtained by bilinear interpolation (or linear interpolation). In the third embodiment, assuming that four distances of "1/8," "−7/8," "3/8," and "−5/8" are obtained as the distance described above, four interpolation coefficients $F_1, F_2, F_3$, and $F_4$ respectively corresponding to these distances are used. In this case, "$F_1$=7/

8," "$F_2=1/8$," "$F_3=5/8$," and "$F_4=3/8$" are assumed. Specifically, the data of one sub-pixel in the four primary colors p, q, s, and t is generated using the two interpolation coefficients out of the four interpolation coefficients and the data of two sub-pixels in the four primary colors P, Q, S, and T.

It should be noted that although two interpolation coefficients are also used in the first embodiment described above, the first and the third embodiments are different in the relationship between the positions of the display pixels of the four primary colors P, Q, S, and T and the positions of the display pixels of the four primary colors p, q, s, and t, for example, and consequently, different interpolation coefficients should be used. It should be noted that since in the third embodiment, there is a sufficient feeling or resolution in the scan line direction, the bilinear interpolation is used instead of the bicubic interpolation described in the second embodiment. It is obvious that the bicubic interpolation described in the second embodiment can also be used.

Then, calculation in generating the p, q, s, and t pixels in an odd line will specifically be explained with reference to FIGS. 30A through 30C, 31A through 31C, 32A through 32C, and 33A throuoh 33C.

FIGS. 30A through 30C are diagrams showing the calculation method for generating the data of the p pixels in an odd line. FIG. 30A shows the pixel arrangement of the four primary colors P, Q, S, and T (specifically, from "$P_0, Q_0, S_0, T_0$" to "$P_5, Q_5, S_5, T_5$") on which the color conversion process has already been executed, and FIG. 30B shows the pixel arrangement of the four primary colors p, q, s, and t (specifically, from "$p_1, q_1, s_1, t_1$" to "$p_3, q_3, s_3, t_3$") on which the sub-pixel process has already been executed. It should be noted that the arrows reaching the four primary colors p, q, s, and t from the four primary colors P, Q, S, and T denote the sub-pixels in the four primary colors P, Q, S, and T used in generating the p pixels. Further, FIG. 30C shows a set of arithmetic expressions for generating the p pixels (specifically, $p_1, p_2, p_3$, and $p_4$).

In this case, in order for generating the three sub-pixels $p_1, p_2$, and $p_3$, the four sub-pixels $P_1, P_2, P_3$, and $P_4$ are looked-up. For example, when the $p_1$ is generated, the $P_1$ and $P_2$ are used. In this case, the distance between the position in the $p_1$ and the position in the $P_1$ becomes "1/8," and the distance between the position in the $p_1$ and the position in the $P_2$ becomes "−7/8." With reference to FIG. 29, "$F_1=7/8$" and "$F_2=1/8$" are obtained as the interpolation coefficients respectively corresponding to these distances. Therefore, the interpolation coefficient of "$F_1=7/8$" is used for the data of $P_1$, and the interpolation coefficient of "$F_2=1/8$" is used for the data of $P_2$. Thus, the operation (the weighted average calculation) for generating the $p_1$ is expressed by the formula shown in the upper column of FIG. 30. Since tie rest of $p_2$ through $p_4$ are also obtained by similar calculation methods to the calculation method for the $p_1$, the explanations therefor will be omitted here.

FIGS. 31A through 31C are diagrams showing the calculation method for generating the data of the q pixels in an odd line. FIG. 31A shows the pixel arrangement of the four primary colors P, Q, S, and T on which the color conversion process has already been executed, and FIG. 31B shows the pixel arrangement of the four primary colors p, q, s, and t on which the sub-pixel process has already been executed. It should be noted that the arrows reaching the four primary colors p, q, s, and t from the four primary colors P, Q, S, and T denote the sub-pixels in the four primary colors P, Q, S, and T used in generating the q pixels. Further, FIG. 31C shows a set of arithmetic expressions or generating the q pixels (specifically, $q_1, q_2, q_3$, and $q_4$). Also in this case, the q pixels are generated by a similar method to the case of generating the p pixels described above.

FIGS. 32A through 32C are diagrams showing the calculation method for generating the data of the s pixels in an odd line. FIG. 32A shows the pixel arrangement of the four primary colors P, Q, S, and T on which the color conversion process has already been executed, and FIG. 32B shows the pixel arrangement of the four primary colors p, q, s, and t on which the sub-pixel process has already been executed. It should be noted that the arrows reaching the four primary colors p, q, s, and t from the four primary colors P, Q, S, and T denote the sub-pixels in the four primary colors P, Q, S, and T used in generating the s pixels. Further, FIG. 32C shows a set of arithmetic expressions for generating the s pixels (specifically, $s_1, s_2, s_3$, and $s_4$). Also in this case, the s pixels are generated by a similar method to the case of generating the p pixels described above.

FIGS. 33A through 33C are diagrams showing the calculation method for generating the data of the t pixels in an odd line. FIG. 33A shows the pixel arrangement of the four primary colors P, Q, S, and T on which the color conversion process has already been executed, and FIG. 33B shows the pixel arrangement of the four primary colors p, q, s, and t on which the sub-pixel process has already been executed. It should be noted that the arrows reaching the four primary colors p, q, s, and t from the four primary colors P, Q, S, and T denote the sub-pixels in the four primary colors P, Q, S, and T used in generating the t pixels. Further, FIG. 33C shows a set of arithmetic expressions for generating the t pixels (specifically, $t_1, t_2, t_3$, and $t_4$). Also in this case, the t pixels are generated by a similar method to the case of generating the p pixels described above.

It should be noted that in accordance with the condition of the input data, the sub-pixel processing circuit 12b2 can switch between performing different operations in the interpolation processes respectively for the even lines and the odd lines and performing the same operation in the interpolation processes for both the even lines and the odd lines similarly to the sub-pixel processing circuit 122 described above. In short, the sub-pixel processing circuit 12b2 performs the different operations in the interpolation process between the even lines and the odd lines as described above in the case in which the data is input, on which the process for shifting a half pitch has not been executed in a main system (e.g., CPU) side of an information device on which the image display device 100 is mounted. In contrast, when the data on which the process of shifting a half pitch has already been executed on the main system side is input, the sub-pixel processing circuit 12b2 performs the same operation in the interpolation process for both the even lines and the odd lines. In this case, the four primary colors p, q, s, and t positioned on either of the even line and the odd line are generated by directly using the four primary colors P, Q, S, and T on which the color conversion process has already been executed.

According to the third embodiment described above, since the interpolation process is executed based on the positions of the p, q, s, and t to be generated when generating the display pixels shifted a half pitch particularly in the odd lines in the case in which the three primary colors R, G, and B and the four primary colors p, q, s, and t have the same number of display pixels, the positional information as the four primary colors p, q, s, and t can be reflected to the data to be generated. Therefore, in the case in which the display pixels are arranged to have the delta arrangement in the display section 20, the detailed positional information of the four primary colors p, q, s, and t can be reflected regarding the odd lines, thus the jaggies in the image contour can appropriately be reduced. In addition, also by the third embodiment, the resolution in the scan line direction can artificially be improved.

Fourth Embodiment

A fourth embodiment of the invention will hereinafter be explained. In the fourth embodiment, totally 960 dots in 320 pixels as the three primary colors R, G and B are converted into totally 640 dots in 160 pixels as the four primary colors p, q, s, and t per scan line by the sub-pixel process. In the first embodiment, the totally 960 dots in the 320 pixels as the three primary colors R, G, and B are converted into the totally 960 dots in the 240 pixels as the four primary colors p, q, s, and t per scan line. The fourth embodiment is different from the first embodiment in that the same number of dots of three primary colors R, G, and B as in the first embodiment are converted into totally 640 dots in 160 pixels as the four primary colors p, q, s, and t. Further, in the first and the second embodiments, the four primary colors p, q, s, and t having the same total number of data as that of the three primary colors R, G, and B input thereto are generated in the sub-pixel process. The fourth embodiment is different therefrom in that the four primary colors p, q, s, and t with the different total number of data from that of the three primary colors R, G and B input thereto are generated in the sub-pixel process. More specifically, although in the first and the second embodiments the number of the display pixels in the four primary colors P, Q, S, and T is reduced to be 0.75 times thereof, in the fourth embodiment, the number of the display pixels in the four primary colors P, Q, S and T is reduced to be 0.5 times thereof. Further, it can be said that the fourth embodiment is different from the third embodiment having the same number of display pixels as in the four primary colors P, Q, S, and T (in other words, the four primary colors p, q, s, and t with the same number of display pixels as that of the four primary colors P, Q, S, and T are generated).

It should be noted that also in the fourth embodiment, the data in which even lines and odd lines are shifted a half pitch of the display pixel unit from each other is generated as the four primary colors p, q, s, and t. Specifically, by performing the interpolation process on the four primary colors P, Q, S, and T, the four primary colors p, q, s, and t having even lines and odd lines shifted a half pitch of the display pixel unit from each other are generated.

Figure 34A:
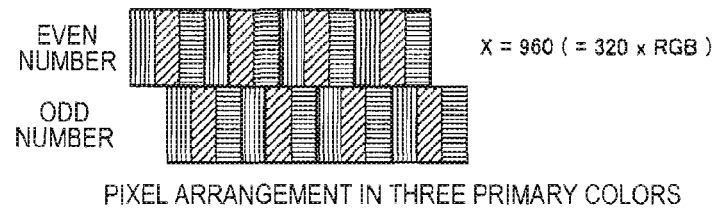
FIGS. 34A and 34B are diagrams showing a pixel arrangement for explaining a sub-pixel process in a fourth embodiment.
Figure 34B:
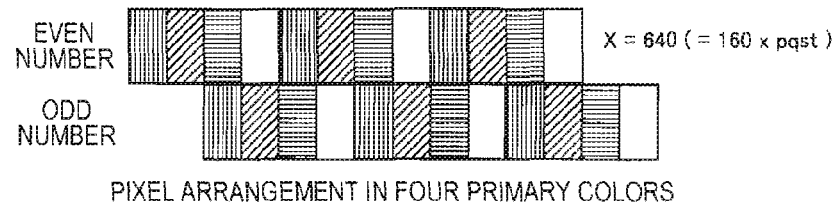

FIGS. 34A and 34B are diagrams showing a pixel arrangement for explaining the sub-pixel process according to the fourth embodiment. FIG. 34A shows the pixel arrangement in the three primary colors R, G, and B, and FIG. 34B shows the pixel arrangement in the four primary colors p, q, s, and t. According to FIGS. 34A and 34B, it proves that the display pixels are arranged so that the pixel arrangement in an even line of the scan lines and the pixel arrangement in an odd line thereof are shifted a half pitch of the display pixel unit from each other. In other words, it proves that the display pixels are arranged in a delta arrangement. In the fourth embodiment, the image data of the four primary colors p, q, s, and t composed of totally 640 dots in 160 pixels (160 display pixels) is generated from the image data of the three primary colors R, G, and B composed of totally 960 dots in 320 pixels (320 display pixels) per scan line. In other words, the four primary colors p, q, s, and t with the different total data number (specifically, 640 dots) from the total data number (specifically, 960 dots) of the three primary colors R, G, and B input thereto are generated.

Figure 35:
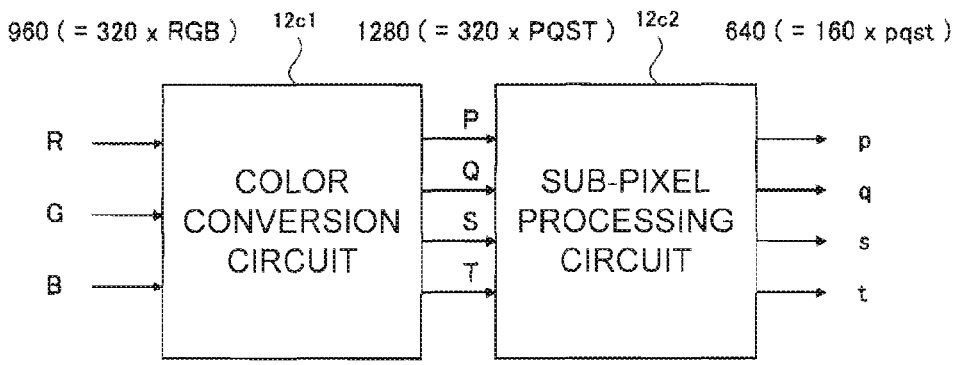
FIG. 35 is a diagram showing change in the number of dots when executing the color conversion process and the sub-pixel process in the fourth embodiment.

FIG. 35 is a diagram specifically showing change in the number of dots when executing the color conversion process and the sub-pixel process in the fourth embodiment. In the fourth embodiment, a color conversion circuit 12c1 in an image processing circuit 12c performs the color conversion process, and a sub-pixel processing circuit 12c2 in the image processing circuit 12c performs the sub-pixel process. It should be noted that the image processing circuit 12c can be applied to the image display device 100 instead of the image processing circuit 12 described above (see FIG. 1).

The color conversion circuit 12c1 obtains the image data of the three primary colors R, G, and B composed of totally 960 dots in 320 pixels per scan line. Then the color conversion circuit 12c1 generates the image data of the four primary colors P, Q, S, and T composed of totally 1280 dots in 320 pixels from the image data of the three primary colors R, G, and B composed of totally 960 dots in 320 pixels per scan line. In other words, the color conversion circuit 12c1 performs the conversion process from the three primary colors R, G, and B to the four primary colors P, Q, S, and T while maintaining the number of the display pixels (320 pixels) in the three primary colors R, G, and B. The sub-pixel processing circuit 12c2 obtains the image data of the four primary colors P, Q, S, and T composed of totally 1280 dots in 320 pixels per scan line, and generates the image data of the four primary colors p, q, s, and t composed of totally 640 dots in 160 pixels per scan line from the image data of the four primary colors P, Q, S, and T. In other words, the number of the display pixels of the four primary colors P, Q, S, and T is reduced to be 0.5 times thereof.

As described above, by disposing 160 pixels in the four primary colors p, g, s, and t, the total number of dots the total number of the sub-pixels) becomes smaller than those of the first and the third embodiments, and consequently, the area of the sub-pixel tends to increase (note that in this case, the area of the sub-pixel is smaller than that of the second embodiment). Taking the light shielding section in the partition of the pixels into consideration, the larger the area of the sub-pixel is, the higher relative aperture ratio as the sub-pixel can be obtained. Therefore, the transmittance can be increased, thus a bright display section can be realized.

Here, although in the fourth embodiment the number of the display pixels of the four primary colors P, Q, S, and T is reduced to be 0.5 times, namely from 320 pixels to 160 pixels, in comparison with the second embodiment, the following can be said. Firstly, in the second embodiment, an external system performs the conversion from 320 pixels of R, G, and B to 160 pixels of R, G, and B by a predetermined method, and after then, the 160 pixels of R, G, and B are transmitted to the image processing section 10 as the color units. In this case, the image processing section 10 receives the 160 pixels of R, G, and B as the color units, and performs the reduction with a magnification of 0.75 (as a result, reduction with a magnification of "0.5×0.75=0.375" is assumed to be executed). In contrast, the fourth embodiment has a configuration in which the image processing section 10 directly receives the 320 pixels of R, G, and B, and internally performs reduction with a magnification of 0.5. Therefore, when taking it as the conversion from the 320 pixels of R, G, and B, it becomes a processing to be completed inside the image processing section 10. Therefore, according the fourth embodiment, in comparison with the second embodiment, the load of conversion in the outside can be reduced, and at the same time, reproduction in higher resolution can be performed.

Then, with reference to FIGS. 36A and 36B, the sub-pixel process executed by the sub-pixel processing circuit 12c2 will be explained. It should be noted that the sub-pixel process will be explained here exemplifying the case of generating the p, q, s, and t pixels in an even line.

Figure 36A:
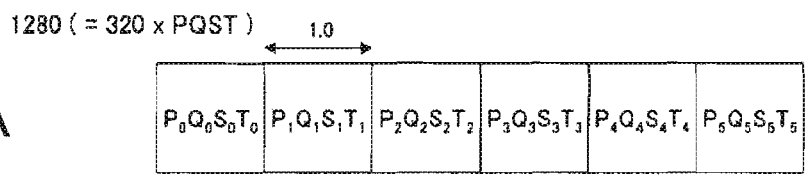
FIGS. 36A and 36B are diagrams showing an outline of the sub-pixel process in even lines in the fourth embodiment.
Figure 36B:
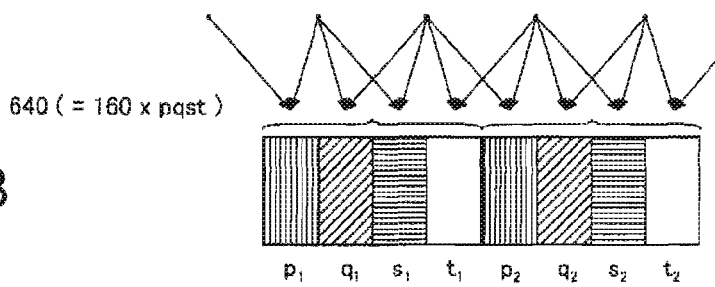

FIGS. 36A and 36B are diagrams schematically showing the sub-pixel process when generating the p, q, s, and t pixels in an even line. FIG. 36A is a diagram showing the pixel arrangement of the four primary colors P, Q, S, and T (specifically, from "$P_0, Q_0, S_0, T_0$" to "$P_5, Q_5, S_5, T_5$") on which the color conversion process has already been executed, and FIG. 36B is a diagram showing the pixel arrangement of the four primary colors p, q, s, and t (specifically, "$p_1, q_1, s_1, t_1$" and "$p_2, q_2, s_2, t_2$") on which the sub-pixel process has already been executed. It should be noted that in FIGS. 36A and 36B, the arrows reaching the four primary colors p, q, s, and t from the four primary colors P, Q, S, and T denote the sub-pixels of the four primary colors P, Q, S, and T looked-up when generating the data of the sub-pixels in the four primary colors p, q, s, and t.

In the fourth embodiment, the sub-pixel processing circuit $12c2$ generates the image data of the four primary colors p, q, s, and t composed of 160 pixels per scan line from the image data of the four primary colors P, Q, S, and T composed of 320 pixels by executing the sub-pixel process. Specifically, from a local viewpoint, the sub-pixel processing circuit $12c2$ performs the process of generating two pixels (two display pixels) in p, q, s, and t from four pixels (four display pixels) in P, Q, S, and T (it should be noted that the previous and the next pixels of the four pixels in the P, Q, S, and T are partially used). In other words, the process for reducing the number of display pixels to be 0.5 times thereof is performed. In this case, the sub-pixel processing circuit $12c2$ performs the interpolation process based on the relationship between the sub-pixel positions in the four primary colors P, Q, S, and T on which the color conversion process has been performed and the sub-pixel positions in the four primary colors p, q, s, and t.

Specifically, the sub-pixel processing circuit $12c2$ performs the interpolation process by performing the weighted average calculation in accordance with the distance between the position of the sub-pixel in the four primary colors P, Q, S, and T and the position of the sub-pixel in the four primary colors p, q, s, and t assuming that the distance between the color pixels of the P, Q, S, and T is "1.0. " More specifically, the data of one sub-pixel in the four primary colors p, q, s, and t is generated by referring to the data of two of the sub-pixels (specifically, the sub-pixels in the four primary colors P, Q, S, and T close to the sub-pixel in the four primary colors p, q, s, and t) in the four primary colors P, Q, S, and T. In this case, the sub-pixel processing circuit $12c2$ generates the data of the sub-pixel in the p, q, s, and t by performing the interpolation process on the data of the sub-pixel in the four primary colors P, Q, S, and T corresponding to the color of the sub-pixel in the four primary colors p, q, s, and t to be obtained. In other words, the data of the p pixel is obtained from the data of the P pixels, and the data of the q pixel is obtained from the data of the Q pixels. It should be noted that the interpolation process method as described above is basically executed in a similar manner irrespective of whether the four primary colors p, q, s, and t to be generated are positioned on an even line or an odd line.

Figure 37:
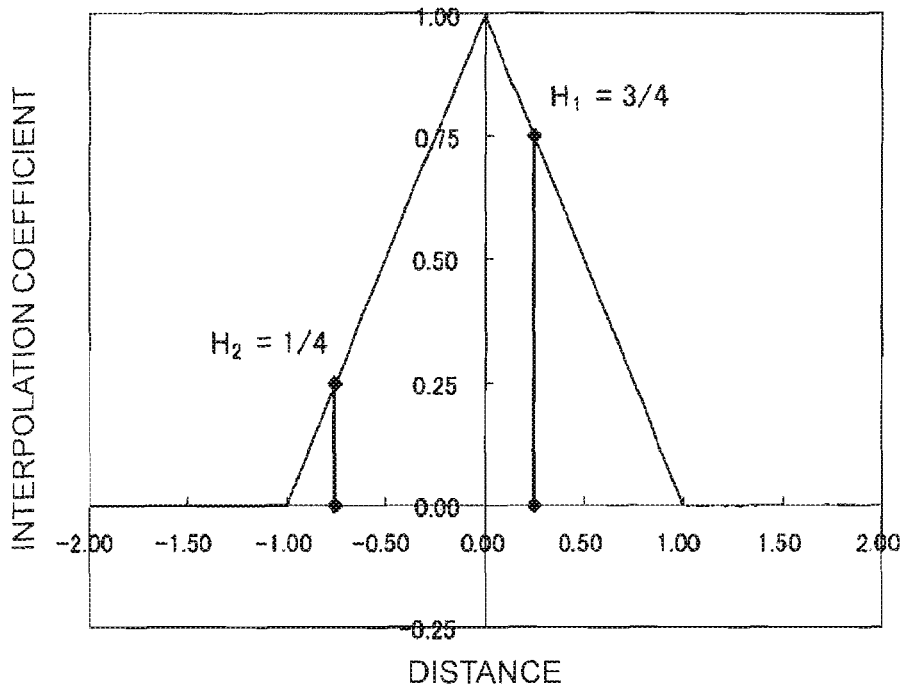
FIG. 37 is a diagram showing an interpolation coefficient used in the fourth embodiment.

FIG. 37 is a diagram showing an interpolation coefficient (in other words, a weight used in executing the weighted average calculation) used in executing the interpolation process described above. In FIG. 37, the horizontal axis represents the distance between the position of the sub-pixel in the four primary colors P, Q, S, and T and the position of the sub-pixel in the four primary colors p, q, s, and t, and the vertical axis represents the interpolation coefficient. In this case, the interpolation coefficient can be obtained by a linear function defined by the distance between the position of the sub-pixel in the four primary colors P, Q, S, and T and the position of the sub-pixel in the four primary colors p, q, s, and t. In other words, the interpolation coefficient can be obtained by bilinear interpolation (or linear interpolation). In the fourth embodiment, since two distances of "1/4" and "−3/4" are obtained as the distance described above, two interpolation coefficients $H_1$ and $H_2$ respectively corresponding to these distances are used. In this case, "$H_1=3/4$" and "$H_2=1/4$" are assumed. Specifically, the data of one sub-pixel in the four primary colors p, q, s, and t is generated using the two interpolation coefficients and the data of two sub-pixels in the four primary colors P, Q, S, and T. It should be noted that the interpolation coefficients as described above are basically used in a similar manner irrespective of whether the four primary colors p, q, s, and t to be generated are positioned on an even line or an odd line.

Then, calculation in generating the p, q, s, and t pixels in an even line will specifically be explained with reference to FIGS. 38A through 38C, 39A through 39C, 40A through 40C, and 41A through 41C.

Figure 38A:
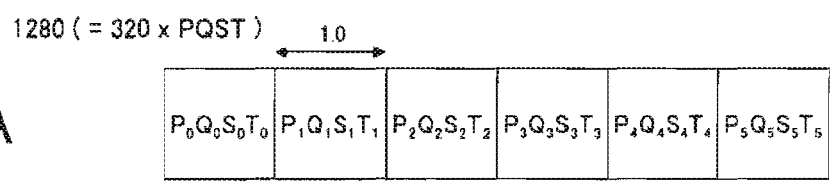
Figure 38B:
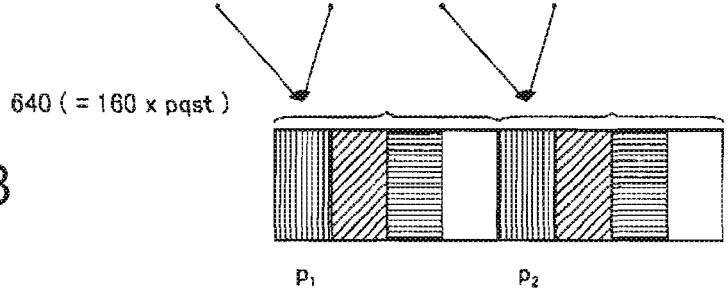

FIGS. 38A through 38C are diagrams showing the calculation method for generating the data of the p pixels in an even line. FIG. 38A shows the pixel arrangement of the four primary colors P, Q, S, and T (specifically, from "$P_0, Q_0, S_0, T_0$" to "$P_5, Q_5, S_5, T_5$") on which the color conversion process has already been executed, and FIG. 38B shows the pixel arrangement of the four primary colors p, q, s, and t (specifically, "$p_1, q_1, s_1, t_1$" and "$p_2, q_2, s_2, t_2$") on which the sub-pixel process has already been executed. It should be noted that the arrows reaching the four primary colors p, q, s, and t from the four primary colors P, Q, S, and T denote the sub-pixels in the four primary colors P, Q, S, and T used in generating the p pixels. Further, FIG. 38C shows a set of arithmetic expressions for generating the p pixels (specifically, $p_1$ and $p_2$).

In this case, in order for generating the two sub-pixels $p_1$ and $p_2$, four sub-pixels $P_1, P_2, P_3$, and $P_4$ are looked-up (note that the $P_0$ in the previous pixel is also used when generating the $p_1$). For example, when the $p_1$ is generated, the $P_0$ and $P_1$ are used. In this case, the distance between the position in the $p_1$ and the position in the $P_0$ becomes "−3/4, " and the distance between the position in the $p_1$ and the position in the $P_1$ becomes "1/4. " With reference to FIG. 37, "$H_2=1/4$" and "$H_1=3/4$" are obtained as the interpolation coefficients respectively corresponding to these distances. Therefore, the interpolation coefficient of "$H_2=1/4$" is used for the data of $P_0$, and the interpolation coefficient of "$H_1=3/4$" is used for the data of $P_1$. Thus, the operation (the weighted average calculation) for generating the $p_1$ is expressed by the formula shown in the upper column of FIG. 38C. Since the rest of $p_2$ is also obtained by a similar calculation method to the calculation method for the $p_1$, the explanations therefor will be omitted here.

Figure 39A:
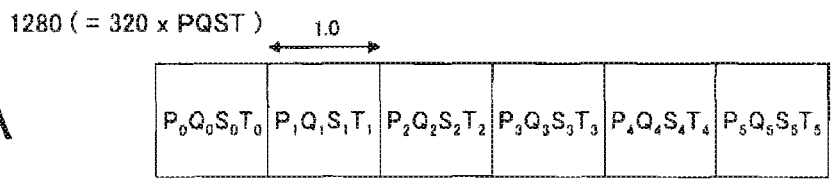
Figure 39B:
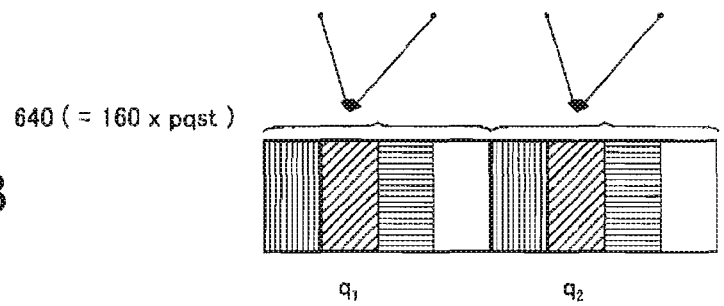

FIGS. 39A through 39C are diagrams showing the calculation method for generating the data of the q pixels in an even line. FIG. 39A shows the pixel arrangement of the four primary colors P, Q, S, and T on which the color conversion process has already been executed, and FIG. 39B shows the pixel arrangement of the four primary colors p, q, s, and t on which the sub-pixel process has already been executed. It should be noted that the arrows reaching the four primary colors p, q, s, and t from the four primary colors P, Q, S, and T denote the sub-pixels in the four primary colors P, Q, S, and T used in generating the q pixels. Further, FIG. 39C shows a set of arithmetic expressions for generating the q pixels (specifically, $q_1$ and $q_2$). Also in this case, the q pixels are generated by a similar method to the case of generating the p pixels described above.

Figure 40A:
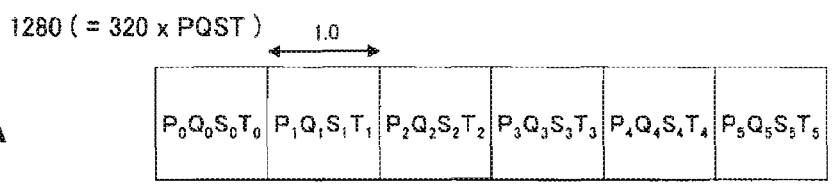
Figure 40B:
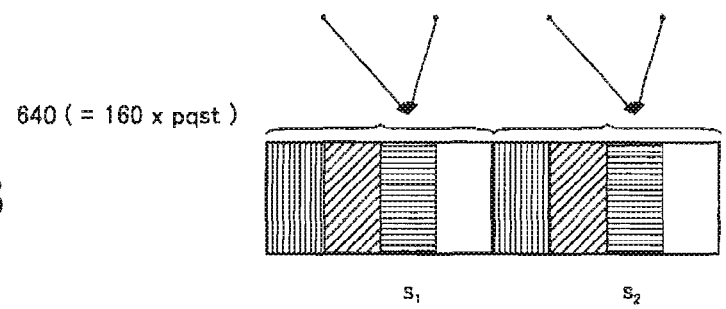

FIGS. 40A through 40C are diagrams showing the calculation method for generating the data of the s pixels in an even line. FIG. 40A shows the pixel arrangement of the four primary colors P, Q, S, and T on which the color conversion process has already been executed, and FIG. 40B shows the pixel arrangement of the four primary colors p, q, s, and t on which the sub-pixel process has already been executed. It should be noted that the arrows reaching the four primary colors p, q, s, and t from the four primary colors P, Q, S, and T denote the sub-pixels in the four primary colors P, Q, S, and T used in generating the s pixels. Further, FIG. 40C shows a set of arithmetic expressions for generating the s pixels (specifically, $s_1$ and $s_2$). Also in this case, the s pixels are generated by a similar method to the case of generating the p pixels described above.

FIGS. 41A through 41C are diagrams showing the calculation method for generating the data of the t pixels in an even line. FIG. 41A shows the pixel arrangement of the four primary colors P, Q, S, and T on which the color conversion process has already been executed, and FIG. 41B shows the pixel arrangement of the four primary colors p, q, s, and t on which the sub-pixel process has already been executed. It should be noted that the arrows reaching the four primary colors p, q, s, and t from the four primary colors P, Q, S, and T denote the sub-pixels in the four primary colors P, Q, S, and T used in generating the t pixels. Further, FIG. 41C shows a set or arithmetic expressions for generating the t pixels (specifically, $t_1$ and $t_2$). Also in this case, the t pixels are generated by a similar method to the case of generating the p pixels described above.

Then, calculation in generating the p, q, s, and t-pixels in an odd line will specifically be explained with reference to FIGS. 42A through 42C.

FIGS. 42A through 42C are diagrams showing the calculation method for generating the data of the p, q, s, and t pixels in an odd line. FIG. 42A shows the pixel arrangement of the four primary colors P, Q, S, and T on which the color conversion process has already been executed, and FIG. 42B shows the pixel arrangement of the four primary colors p, q, s, and t on which the sub-pixel process has already been executed. It should be noted that the arrows reaching the four primary colors p, q, s, and t from the four primary colors P, Q, S, and T denote the sub-pixels in the four primary colors P, Q, S, and T used in generating the p, q, s, and t-pixels. Further, FIG. 42C shows sets of arithmetic expressions for generating all of the p, q, s, and t pixels (specifically, $p_1$ and $p_2$, $q_1$ and $q_2$, $s_1$ and $s_2$, and $t_1$ and $t_2$).

Also in the case of generating the data of the p, q, s, and t-pixels in an odd line, the interpolation process is executed by a similar method to the method used in the case of generating the data of the p, q, s, and t-pixels in an even line as described above. In other words, the pixels to be looked-up and the interpolation coefficients when executing the interpolation process are basically the same in both odd lines and even lines. It should be noted that since the display pixels are arranged so that the even lines and the odd lines are shifted a half pitch (two sub-pixel units) of the display pixel unit from each other, the even lines and the odd lines are different in the combination of the pixels to be looked-up and the interpolation coefficient when executing the interpolation process. In other words, the even lines and the odd lines are different in the sub-pixels in the four primary colors P, Q, S, and T close to the sub-pixels in the four primary colors p, q, s, and t, and tend to be different in the distance therebetween even if the sub-pixels to be looked-up are the same. For example, while the pixels to be looked-up in generating the $p_1$ pixel in the even line are the $P_0$ and $P_1$ pixels (see FIG. 38C), the pixels to be looked-up in generating the $p_1$ pixel in the odd line become the $P_1$ and $P_2$ pixels (see FIG. 42C). FIG. 42C shows the sets of arithmetic expressions in the interpolation process corresponding to all of the p, q, s, and t pixels.

It should be noted that in accordance with the condition of the input data, the sub-pixel processing circuit 12c2 can switch between performing different operations in the interpolation processes respectively for the even lines and the odd lines and performing the same operation in the interpolation processes for both the even lines and the odd lines similarly to the sub-pixel processing circuit 122 described above. In other words, the sub-pixel processing circuit 12c2 performs the different operations in the interpolation process between the even lines and the odd lines in the case in which the data is input, on which the process for shifting a half pitch has not been executed in a main system (e.g., CPU) side of an information device on which the image display device 100 is mounted, and when the data on which the process of shifting a half pitch has already been executed on the main system side is input, the sub-pixel processing circuit 12c2 performs the same operation in the interpolation process for both the even lines and the odd lines.

According also to the fourth embodiment described above, in the case in which the display pixels are composed to have a delta arrangement in the display section 20, the detailed positional information of the four primary colors p, q, s, and t can be reflected, thus the jaggies in the image contour can appropriately be reduced while performing the color reproduction in the four primary color display. In particular, in the fourth embodiment, 160 pixels of four primary colors p, q, s, and t can be disposed in per scan line, and consequently, the area of the sub-pixel can be increased, thus the relative aperture ratio can be increased. Therefore, it becomes possible to realize a bright display section. Further, according to the fourth embodiment, if the 320 pixels of three primary colors R, G, and B are input, the 160 pixels of four primary colors p, q, s, and t can be generated from the input data by reducing the number of display pixels to be 0.5 times thereof, and consequently, an additional external circuit for converting the number of pixels can be eliminated, thus the low cost configuration as a whole can be adopted. In addition, also by the fourth embodiment, the resolution in the scan line direction can artificially be improved.

Example of Display Pixel Arrangement

Here, an example of the display pixel arrangement (the delta arrangement) in the display section 20 will be explained with reference to FIGS. 43A, 43B, 44A, 44B, 45A, and 45B.

FIGS. 43A and 43B are diagrams for explaining a display pixel arrangement according to a first example. The display pixel arrangement according to the first example corresponds to the fourth embodiment described above.

As shown in FIG. 43A, assuming that the vertical length A12 of the display pixel is "1.0," the lateral length A21 of the display pixel is obtained as "A21=A12×2=2.0." It should be noted that in FIG. 43A small filled circles 180 on the lattice points represent points with the input data, and the lattice points with open circles 181 represent points (sample points) with data after the number of points in the scan line direction has been changed (changed by, for example, a resample circuit) in order for conforming to the positions of the display pixels in the display section.

FIG. 43B shows the display pixel arrangement. According to the right illustration in FIG. 43B, the lateral length B21 of the sub-pixel is obtained as "B21=A21/4=0.5." Further, according to the left illustration in FIG. 43B, since there is a shift of a half pitch (A21/2) of the display pixel from a vertical line, the same kind of sub-pixels are arranged "A21/2" shifted from each other. On the other hand, from a viewpoint of the sub-pixel unit, the vertical position of one sub-pixel is the same as that of an adjacent sub-pixel in the lower line. In other words, in the middle of a sub-pixel in one line, a boundary between two sub-pixels in another line is never positioned.

FIGS. 44A and 44B are diagrams for explaining a display pixel arrangement according to a second example. The display pixel arrangement according to the second example corresponds to the first and the second embodiments described above.

As shown in FIG. 44A, assuming that the vertical length A12 of the display pixel is "1.0," the lateral length A31 of the display pixel is obtained as "A31=A12×1.5=1.5." FIG. 44B shows the display pixel arrangement. In this case, the lateral length B31 of the sub-pixel is obtained as "B31=A31/4=0.375." Further, since there is a shift of a half pitch (A31/2) of the display pixel from a vertical line, the same kind of sub-pixels are arranged "A31/2" shifted from each other. On the other hand, from a viewpoint of the sub-pixel unit, the vertical position of one sub-pixel is the same as that of an adjacent sub-pixel in the lower line.

FIGS. 45A and 45B are diagrams for explaining a display pixel arrangement according to a third example. The display pixel arrangement according to the third example corresponds to the third embodiment described above.

As shown in FIG. 45A, assuming that the vertical length A12 of the display pixel is "1.0," the lateral length A41 of the display pixel is obtained as "A41=A12×1=1.0." FIG. 44B shows the display pixel arrangement. In this case, the lateral length B41 of the sub-pixel is obtained as "B41=A41/4=0.25." Further, since there is a shift of a half pitch (A41/2) of the display pixel from a vertical line, the same kind of sub-pixels are arranged "A41/2" shifted from each other. On the other hand, from a viewpoint of the sub-pixel unit, the vertical position of one sub-pixel is the same as that of an adjacent sub-pixel in the lower line.

MODIFIED EXAMPLE

Although in the embodiments described above the cases in which the input to the image processing circuit 12, 12a, 12b, 12c is 320 color pixels (960 dots in R, G, and B) and 160 color pixels (480 dots in R, G, and B) are described, the invention can be applied to other numbers of pixels.

Further, although in the embodiments described above the four primary colors are generalized as P, Q, S, and T or p, q, s, and t, red, yellow-green, blue, and emerald-green, or red, green, blue, and white can be used as the P, Q, S, and T or p, q, s, and t. Further, as another example, red, green, blue, and yellow can be used as the P, Q, S, and T or p, q, s, and t. It should be noted that in the calculation of the interpolation process, the order of arrangement of the sub-pixels does not particularly matter. For example, if the order of the arrangement of red, green, blue, and white is changed variously, the interpolation coefficients (the patterns of the weighted calculation) used for the interpolation process are not basically changed.

Further, although an example of forming the display section 20 using the liquid crystal device (LCD) is described above, any display devices other than the LCD can be used as the display section for performing multi-primary-color display. The display section for performing flat display such as an organic EL display device (OLED), a plasma display device (PDP), a cathode-ray tube display device (CRT), or a field emission display device (FED) can be used. Further, in the case of using the LCD, the invention can be applied to a transmissive type, a reflective type, and transflective type.

Further, in the case of configuring the display section 20 using the liquid crystal device (LCD), the configuration of the color filter or the backlight does not matter. For example, a white backlight using a combination of a blue LED and a fluorescent material, or an RGB three-color LED backlight can be used as the backlight.

Further, although the operations performed in the conversion described above is basically assumed to be performed by a circuit, the operations can also be performed by software processing. For example, the functions provided with the image processing circuit 12, 12a, 12b, 12c can be realized by an image processing program processed by the CPU (computer). It should be noted that the image processing program can previously be stored in a hard drive or a ROM, or supplied from the outside with a computer readable recording medium such as a CD-ROM, and the image processing program retrieved from the CD-ROM drive can be stored in the hard drive.

The entire disclosure of Japanese Patent Application Nos: 2007-024200, filed Feb. 2, 2007 and 2007-287503, filed Nov. 5, 2007 are expressly incorporated by reference herein.

What is claimed is:

1. An image processing device for outputting four-color image data to a display section, the display section performing display using display pixels each composed of four sub-pixels, and having an arrangement of the display pixels in which a pixel arrangement in an even line of a plurality of scan lines and a pixel arrangement in an odd line of the scan lines are shifted a half pitch of the display pixels from each other, the image processing device comprising:
   a color conversion section that obtains three-color image data and converts the three-color image data into first four-color image data while maintaining the number of display pixels in the three-color image data;
   a conversion section that generates second four-color image data by performing an interpolation process on the first four-color image data based on a relationship between a position of a sub-pixel in the first four-color image data and a position of a sub-pixel in the display section; and
   an output section that outputs the second four-color image data to the display section.

2. The image processing device according to claim 1, wherein the conversion section generates the second four-color image data having the even line and the odd line shifted a half pitch of the display pixels from each other by performing the interpolation process on the first four-color image data.

3. The image processing device according to claim 2, wherein the conversion section switches operations to be performed in the interpolation process in accordance with whether the second four-color image data to be generated is positioned in the even line or in the odd line.

4. The image processing device according to claim 1, wherein the conversion section performs the interpolation process in accordance with whether or not the first four-color image data is data with the even line and the odd line shifted a half pitch of the display pixels.

5. The image processing device according to claim 1, wherein the conversion section performs the interpolation process using a linear function defined by a distance between a position of a sub-pixel in the first four-color image data and a position of a sub-pixel in the display section.

6. The image processing device according to claim 1, wherein the conversion section performs the interpolation process using a cubic function defined by a distance between a position of a sub-pixel in the first four-color image data and a position of a sub-pixel in the display section.

7. The image processing device according to claim 1, wherein the conversion section generates the second four-color image data reducing the number of the display pixels to be 0.75 times the number of display pixels in the first four-color image data.

8. The image processing device according to claim 1, wherein the conversion section generates the second four-color image data reducing the number of the display pixels to be 0.5 times the number of display pixels in the first four-color image data.

9. The image processing device according to claim 1, wherein the conversion section generates the second four-color image data having the same number of the display pixels as the number of display pixels in the first four-color image data.

10. The image processing device according to claim 1, wherein the first and the second four-color image data are composed of red, green, blue, and white.

11. The image processing device according to claim 1, wherein the first and the second four-color image data are composed of red, yellow-green, blue, and emerald-green.

12. The image processing device according to claim 1, wherein the color conversion section performs the color conversion using at least one of a three-dimensional look-up table and a one-dimensional look-up table.

13. An image display device comprising:
the image processing device according to claim 1; and
a display section that displays the image data processed by the image processing device.

14. An image processing method for outputting four-color image data to a display section, the display section performing display using display pixels each composed of four sub-pixels, and having an arrangement of the display pixels in which a pixel arrangement in an even line of a plurality of scan lines and a pixel arrangement in an odd line of the scan lines are shifted a half pitch of the display pixels from each other, the image processing method comprising:
converting three-color image data obtained previously into first four-color image data while maintaining the number of display pixels in the three-color image data;
generating second four-color image data by performing an interpolation process on the first four-color image data based on a relationship between a position of a sub-pixel in the first four-color image data and a position of a sub-pixel in the display section; and
outputting the second four-color image data to the display section.

15. A computer readable recording medium storing an image processing program for allowing a computer to output four-color image data to a display section, the display section performing display using display pixels each composed of four sub-pixels, and having an arrangement of the display pixels in which a pixel arrangement in an even line of a plurality of scan lines and a pixel arrangement in an odd line of the scan lines are shifted a half pitch of the display pixels from each other, the image processing device program allowing the computer to function as a device comprising:
a color conversion section that obtains three-color image data and converts the three-color image data into first four-color image data while maintaining the number of display pixels in the three-color image data;
a conversion section that generates second four-color image data by performing an interpolation process on the first four-color image data based on a relationship between a position of a sub-pixel in the first four-color image data and a position of a sub-pixel in the display section; and
an output section that outputs the second four-color image data to the display section.

* * * * *